United States Patent
Tanida et al.

(10) Patent No.: US 11,270,473 B2
(45) Date of Patent: Mar. 8, 2022

(54) MECHANICAL FASTENING UNIT MANAGEMENT METHOD USING AUGMENTED REALITY

(71) Applicants: HITACHI, LTD., Tokyo (JP); ARDE CO., LTD., Tokyo (JP); KYOTO TOOL CO., LTD., Kyoto (JP)

(72) Inventors: Yuta Tanida, Tokyo (JP); Norihisa Okada, Tokyo (JP); Yoshifumi Kobayashi, Tokyo (JP); Atsuo Kikuna, Kanagawa (JP); Takumi Nakamura, Kanagawa (JP); Miwa Yamaura, Kanagawa (JP); Gojiro Yamaguchi, Kanagawa (JP); Shogo Nakata, Kyoto (JP); Yusuke Hirai, Kyoto (JP)

(73) Assignees: HITACHI, LTD., Tokyo (JP); ARDE CO., LTD., Tokyo (JP); KYOTO TOOL CO., LTD., Kyoto (JP)

( * ) Notice: Subject to any disclaimer, the term of this patent is extended or adjusted under 35 U.S.C. 154(b) by 0 days.

(21) Appl. No.: 17/283,697

(22) PCT Filed: Oct. 10, 2018

(86) PCT No.: PCT/JP2018/037681
§ 371 (c)(1),
(2) Date: Apr. 8, 2021

(87) PCT Pub. No.: WO2020/075232
PCT Pub. Date: Apr. 16, 2020

(65) Prior Publication Data
US 2021/0350588 A1  Nov. 11, 2021

(51) Int. Cl.
*G06T 11/00* (2006.01)
*B25B 23/142* (2006.01)

(52) U.S. Cl.
CPC .......... *G06T 11/00* (2013.01); *B25B 23/1425* (2013.01)

(58) Field of Classification Search
None
See application file for complete search history.

(56) References Cited

U.S. PATENT DOCUMENTS 11,029,762 B2 * 6/2021 Doornenbal ........ G06F 3/04815
2018/0098813 A1 * 4/2018 Nesichi ................. A61B 34/10
(Continued)

OTHER PUBLICATIONS

Extending the Body to Virtual Tools Using a Robotic Surgical Interface: Evidence from the Crossmodal Congruency Task Sengül A, van Elk M, Rognini G, Aspell JE, et al. (2012) Extending the Body to Virtual Tools Using a Robotic Surgical Interface: Evidence from the Crossmodal Congruency Task. (Year: 2012).*

(Continued)

*Primary Examiner* — Nurun N Flora
(74) *Attorney, Agent, or Firm* — Mattingly & Malur, PC

(57) ABSTRACT

In an operation management system in the related art, it is necessary to add an identification mark such as an RFID tag to each component to be managed and prepare a fastening tool having an antenna. In contrast, a mechanical fastening unit management method is provided using an augmented reality space generated by superimposing a virtual space on a real space. In the augmented reality space where a real fastening unit (RBn) and a virtual fastening unit (IBn) are in a one-to-one correspondence, information that the real fastening unit is selected as a fastening target is acquired with a camera or the like, and analyzed by an augmented reality server connected to the camera. Accordingly, it is possible to easily record that a predetermined operation is progressing as scheduled, and to provide a high quality mechanical fastening unit management method or system that is low in operation cost.

9 Claims, 19 Drawing Sheets

(56) References Cited

U.S. PATENT DOCUMENTS

2018/0164982 A1\* 6/2018 Rakshit .............. G06F 3/04815
2018/0356879 A1\* 12/2018 Yang ....................... G06F 3/012
2019/0355278 A1\* 11/2019 Sainsbury ............. A61B 34/30

OTHER PUBLICATIONS

International Search Report of JP2018/037681 dated Dec. 25, 2018.
Written Opinion of the International Searching Authority dated Dec. 25, 2021.

\* cited by examiner

FIG. 13

DESIGN DRAWING INFORMATION (EXAMPLE)

| No. | INFORMATION | ITEM | CONTENT |
|---|---|---|---|
| 1 | DESIGN DRAWING INFORMATION | DRAWING NUMBER | ○○-△□○△ |
| 2 | | DRAWING NAME | ASSEMBLY DRAWING IN WHICH COMPONENT IS ATTACHED TO SUBSTRATE |
| 3 | | COMPONENT NAME, MATERIAL | BASE (D1), ALUMINUM ALLOY |
| 4 | | COMPONENT NAME, MATERIAL | COMPONENT (D2), ALUMINUM ALLOY |
| 5 | | 3D DATA | ASSEMBLY DRAWING IN WHICH COMPONENT WAS ATTACHED TO BASE (3D CAD DATA IN VIRTUAL SPACE) |
| 6 | | BOLT SIZE | M16 |
| 7 | | BOLT BODY LENGTH | 60mm |
| 8 | | BOLT MATERIAL | STAINLESS STEEL |
| 9 | | SPECIFIED FASTENING TORQUE | 106 (N·m) |
| 10 | | NUMBER OF BOLTS | 4 |

FIG. 14

OPERATION INFORMATION (EXAMPLE)

| No. | INFORMATION | ITEM | CONTENT |
|---|---|---|---|
| 1 | | OPERATION CONTENT (NAME) | OPERATION OF ATTACHING COMPONENT (D2) TO SUBSTRATE (D1) WITH 4 BOLTS |
| 2 | | OPERATION DATE AND TIME | mm dd, 20XX |
| 3 | DESIGN DRAWING INFORMATION | DESIGN DRAWING INFORMATION | DRAWING NUMBER: ○○-△□○△<br>DRAWING NAME: ASSEMBLY DRAWING IN WHICH COMPONENT IS ATTACHED TO SUBSTRATE |
| 3 | | OPERATOR ID | hijk_lmn |
| 4 | | OPERATION TARGET | XX TYPE TRAIN, FORMATION NO.YY, CAR NO. ZZ, POSITION 1-3 COMPONENT ATTACHMENT |
| 5 | | OPERATION START TIME POINT | gg:hh:ii |
| 6 | | COMPONENT (D2) INFORMATION | COMPONENT NAME: D2<br>MANUFACTURE NUMBER: ○△◇○ |
| 7 | | OPERATION PLACE | X FACTORY |
| 8 | | OPERATION COMPLETION TIME POINT | LATEST TIME POINT AMONG THOSE OF B1 TO B4 (4 PARTS) jj:kk:ll |

MECHANICAL FASTENING UNIT MANAGEMENT METHOD USING AUGMENTED REALITY

TECHNICAL FIELD

The present invention relates to mechanical fastening unit management using augmented reality.

BACKGROUND ART

Augmented reality is a technology for augmenting a real environment perceived by a human using a computer. In the invention, a virtual space, which is constructed with a technology such as 3D-CAD or computer graphics (CG), is superimposed onto a real space imaged with a camera or the like to generate an augmented reality space, and a mechanical fastening unit such as a device is managed using the augmented reality space.

In the related art, there has been known an operation management system that provides high quality operation management by securing traceability by associating information on fastening of bolts, flanges, and the like acquired via a tool or measuring instrument with tool and measuring instrument data supplied for operation or ID information of an operator (see, for example, PTL 1).

CITATION LIST

Patent Literature

PTL 1: Japanese Patent No. 5065851

SUMMARY OF INVENTION

Technical Problem

The operation management system described in PTL 1 is a system that can secure traceability of a fastening tool or measuring device, which sets and measures individual pieces of bolt fastening operation data relates to flange fastening, and traceability of used bolts or the like, and that can prevent an input error of set fastening torque target value or set fastening allowance target value due to a human mistake, or a description error of an actually measured fastening torque value or an actually measured fastening allowance.

However, in the operation management system described in PTL 1, it is necessary to provide RFIC tags to all the bolts related to the flange fastening. Further, in order to transmit and receive information of the RFIC tags provided in these bolts, it is necessary to prepare a fastening tool having an antenna extending to a head portion that grips the bolts, so that there is a concern that the operation cost is increased.

Therefore, an object of the invention is to provide a high quality mechanical fastening unit management method or system that is low in operation cost and can easily record that a predetermined operation is progressing as scheduled, without adding an identification mark such as an RFIC tag to a fastening unit and without requiring transmission and reception of data between the fastening unit and the fastening tool.

Solution to Problem

In order to solve the above problems, one exemplary mechanical fastening unit management method using augmented reality of the invention, is a mechanical fastening unit management method using an augmented reality space generated by superimposing a virtual space on a real space, the real space includes a real fastening unit and a real tool to be covered on the real fastening unit, the virtual space includes a virtual fastening unit and a virtual tool to be covered on the virtual fastening unit, the real fastening unit and the virtual fastening unit are in a one-to-one correspondence in the augmented reality space, an augmented reality configuring system for generating the augmented reality space includes a camera that images the real space and an augmented reality server that is connected to the camera and analyzes an image captured by the camera, and the management method includes a fastening target determining step of selecting the real fastening unit as a fastening target by covering a head portion of the real tool on the real fastening unit, and transmitting information that the real fastening unit is selected as a fastening target to the virtual fastening unit.

Advantageous Effect

According to the present invention, it is possible to provide a high quality mechanical fastening portion management method or system that is low in operation cost and can easily record that a predetermined operation is progressing as scheduled without adding an identification mark such as an RFIC tag to the fastening portion and without requiring data transmission and reception between the fastening portion and the fastening tool.

Problems, configurations and effects other than those described above will be clarified by description of the following embodiments.

BRIEF DESCRIPTION OF DRAWINGS

FIG. 13 is a table illustrating an example of design drawing information for attaching a component to a base.

FIG. 14 is a table illustrating an example of operation information for attaching a component to a base.

DESCRIPTION OF EMBODIMENTS

Hereinafter, embodiments of the invention will be described with reference to the drawings. It should be noted that the invention is not limited to the embodiments.

Hereinafter, embodiments of the invention will be described with reference to the drawings. A real space in the present specification means a space in which an image obtained by an operator's own vision or an image captured by a camera 10 is placed. A virtual space in the present specification means a space constructed with digital information by 3D-CAD, CG or the like. Hereinafter, a prefix of "real" is added to an article or the like in a real space and a prefix of "virtual" is added to an article or the like in a virtual space in order to distinguish the article or the like in a real space from the article or the like in a virtual space.

System Configuration

Figure 1:
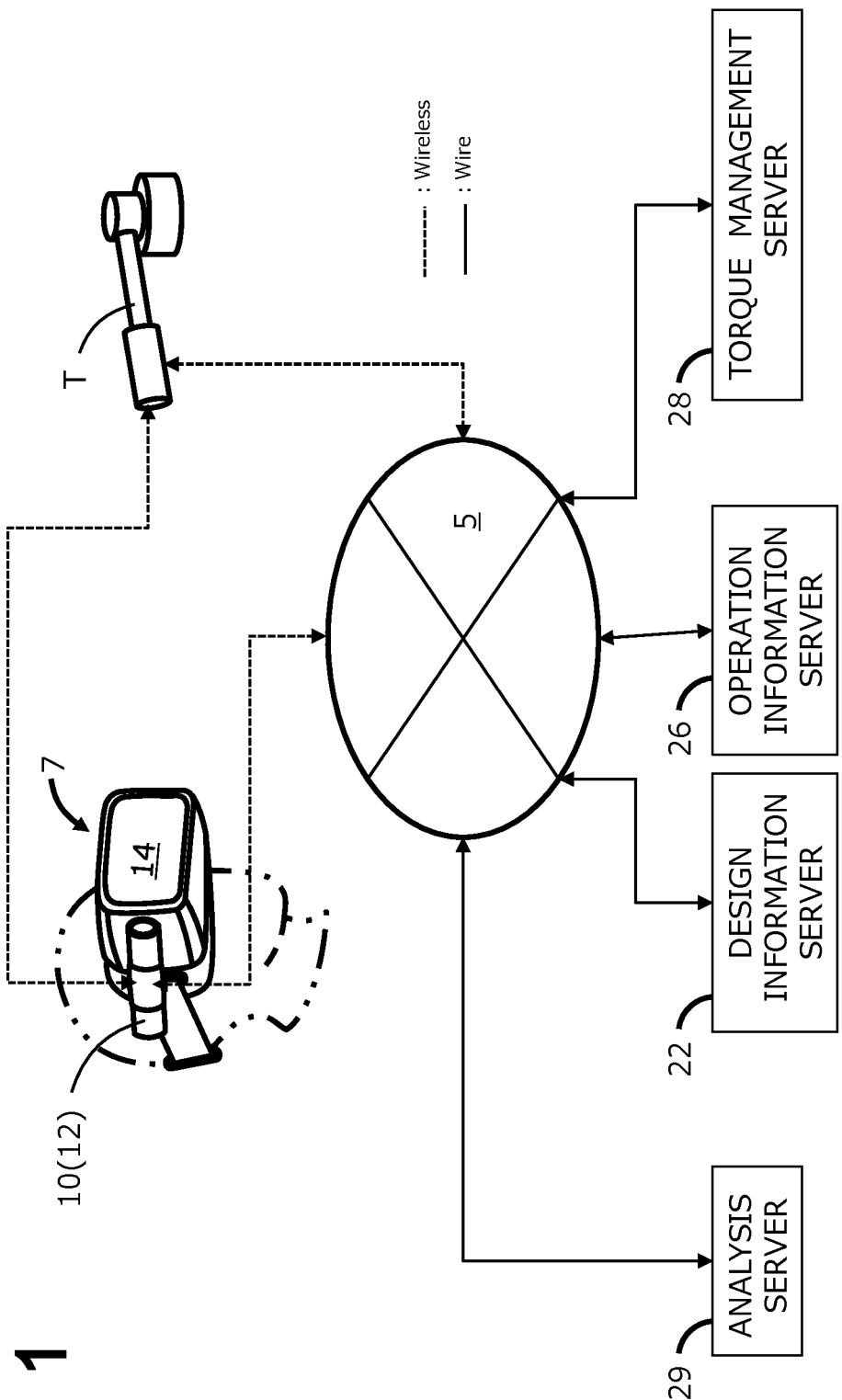
FIG. 1 is a schematic diagram illustrating a system configuration relating to a mechanical fastening unit management method using augmented reality.
Figure 2:
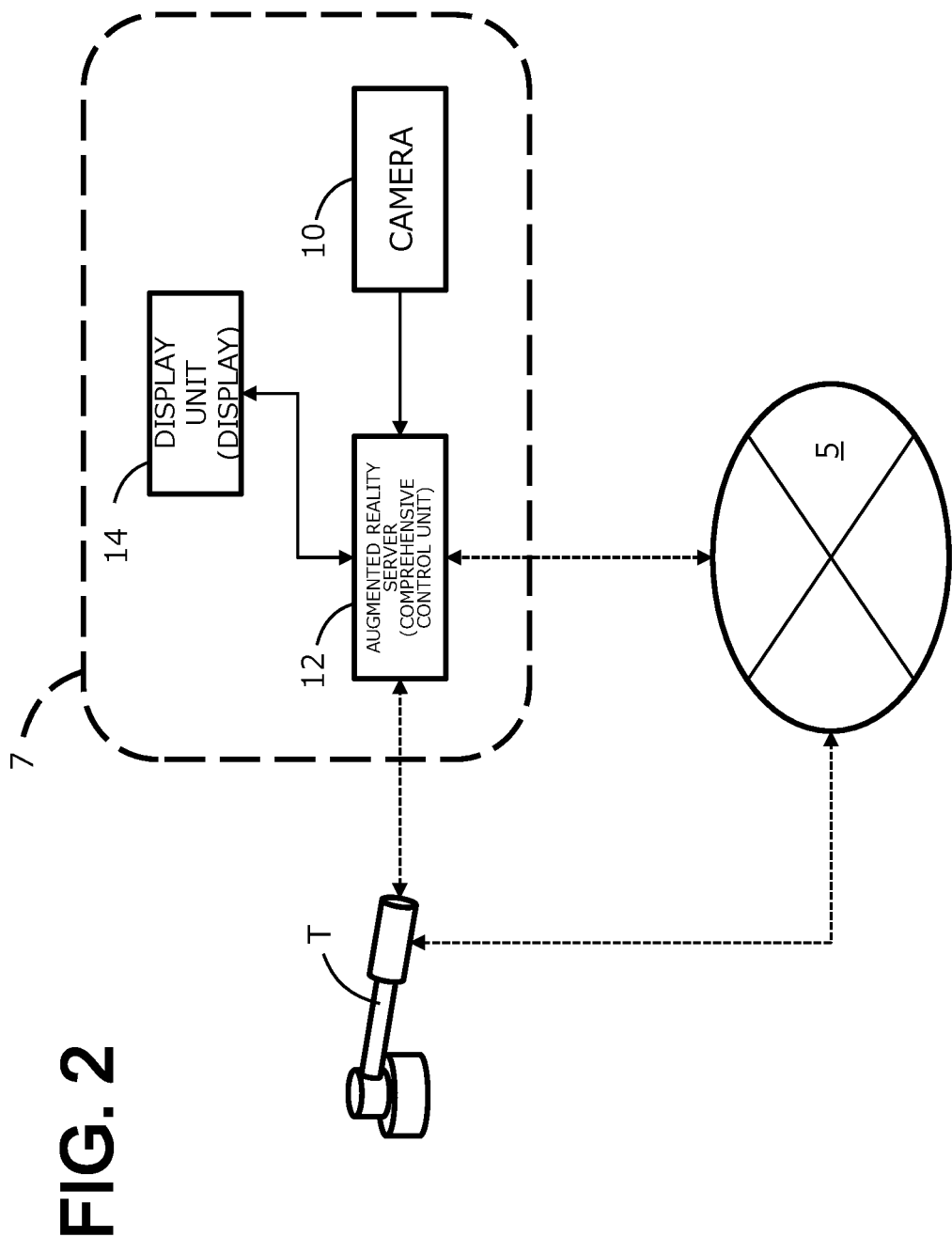
FIG. 2 is a schematic diagram illustrating a functional configuration of a headgear provided in the system configuration of FIG. 1.

FIG. 1 is a schematic diagram illustrating a system configuration relating to a mechanical fastening unit management method using augmented reality, and FIG. 2 is a schematic diagram illustrating a functional configuration of a wearable device (for example, a headgear) provided in the system configuration of FIG. 1.

The system configuration illustrated in FIG. 1 includes: a network 5, to which a design information server 22 for storing design drawing information (see FIG. 12) of a component drawing, an assembly drawing, 3D-CAD, CG, or the like, an operation information server 26 for storing mounting operation information or maintenance operation information (see FIG. 13) of a component, a torque management server 28 for managing a fastening torque at the time of fastening a mechanical fastening unit (that is, a real fastening unit) with a real tool RT, and an analysis server 29 enabling large-scale image analysis are connected; the real tool RT connected to the network 5; and a wearable device 7 provided to an operator.

The wearable device 7 illustrated in FIG. 2 is configured to be attachable to a head of the operator, and includes a transmission type screen 14 (a head-mounted display device) that forms a visual field of the operator, the camera 10, and an augmented reality server 12 to which the transmission type screen 14 and the camera 10 are connected. The augmented reality server 12 constitutes an augmented reality space which is obtained by superimposing virtual space information such as 3D-CAD information obtained from the design information server 22 connected to the network 5 onto a real space (entity) imaged by the camera 10, and projects the augmented reality space on the transmission type screen 14. The augmented reality server 12 is a computer including a memory area that stores application software or various types of information (for example, design information) for creating the augmented reality, and a processing unit that processes a request matter indicated by the operator via the wearable device 7.

The transmission type screen 14 has a transmission property so that a visual field of the operator can be secured, and an image of a real space imaged by the camera 10 or a virtual reality space created by the augmented reality server 12 can be projected onto the transmission type screen 14. At this time, the real space projected on the transmission type screen 14 is substantially the same image as the image obtained by the operator's own vision. Further, the augmented reality server 12 may display on the transmission type screen 14 information on an operation procedure or the like, or information on various manuals, to further improve convenience for the operator.

The augmented reality server 12 is wirelessly connected to the network 5 and the real tool RT. The real tool RT includes a transmission and reception unit that receives fastening torque information corresponding to a predetermined real bolt from the torque management server 28 via the network 5, and that transmits observed fastening torque information of the real tool RT to the augmented reality server 12 and the torque management server 28.

The augmented reality server 12 may be configured integrally with the camera 10, or the memory area and the processing unit of the augmented reality server 12 may be provided at a place away from an operation place via the network 5.

The real tool RT is a tool for fastening or loosening a mechanical fastening unit such as a bolt. The real tool RT is, for example, a torque wrench capable of replacing a socket attached to a head portion and corresponding to a bolt size or a bolt type, and the head portion may be in various torque wrench shapes such as a spanner shape or a monkwrench shape. The real tool RT has a function of collecting the fastening torque information, which is observed at the time of fastening a real bolt RBn, from an initial time of fastening to a completion time of fastening, collecting residual torque information measured at the time of loosening a bolt that has already been fastened, and supplying the fastening torque information and the residual torque information to the torque management server 28 or the like via the augmented reality server 12 and the network 5.

Further, the real tool RT includes a display unit (not shown) that presents to the operator fastening torque information corresponding to any bolt size and bolt material obtained from the augmented reality server 12 or from the torque management server 28, and information indicating the real bolt RBn is fastened with a predetermined fastening torque. Since an object of the display unit is to transmit the above information to the operator, instead of providing the display unit on the real tool RT, these pieces of information may be displayed on the transmission type screen 14, or may be displayed on a display unit of another wearable terminal provided on the wrist or the like of the operator.

The operation information server 26 stores, for example, manufacture operation instructions indicating manufacturing contents for a product (for example, a railroad vehicle or an automobile) and maintenance operation instructions indicating contents of a maintenance operation. In response to a request from the augmented reality server 12, the operation information server 26 extracts necessary data from these operation instructions and provides the extracted data.

The design information server 22, the operation information server 26, and the torque management server 28 are file servers that share and store design information, operation information, information on torque management.

The operation information server 26 does not necessarily need to be independent of the design information server 22, and the operation information server 26 and the design information server 22 may operate as one common information server. The analysis server 29 is used in cases such as one where an image captured by the camera 10 is analyzed on a large scale (image) to obtain detailed coordinates (for example, coordinates indicating a three-dimensional position) of an operation target in a real space or a virtual space.

Operation Content

Figure 3:
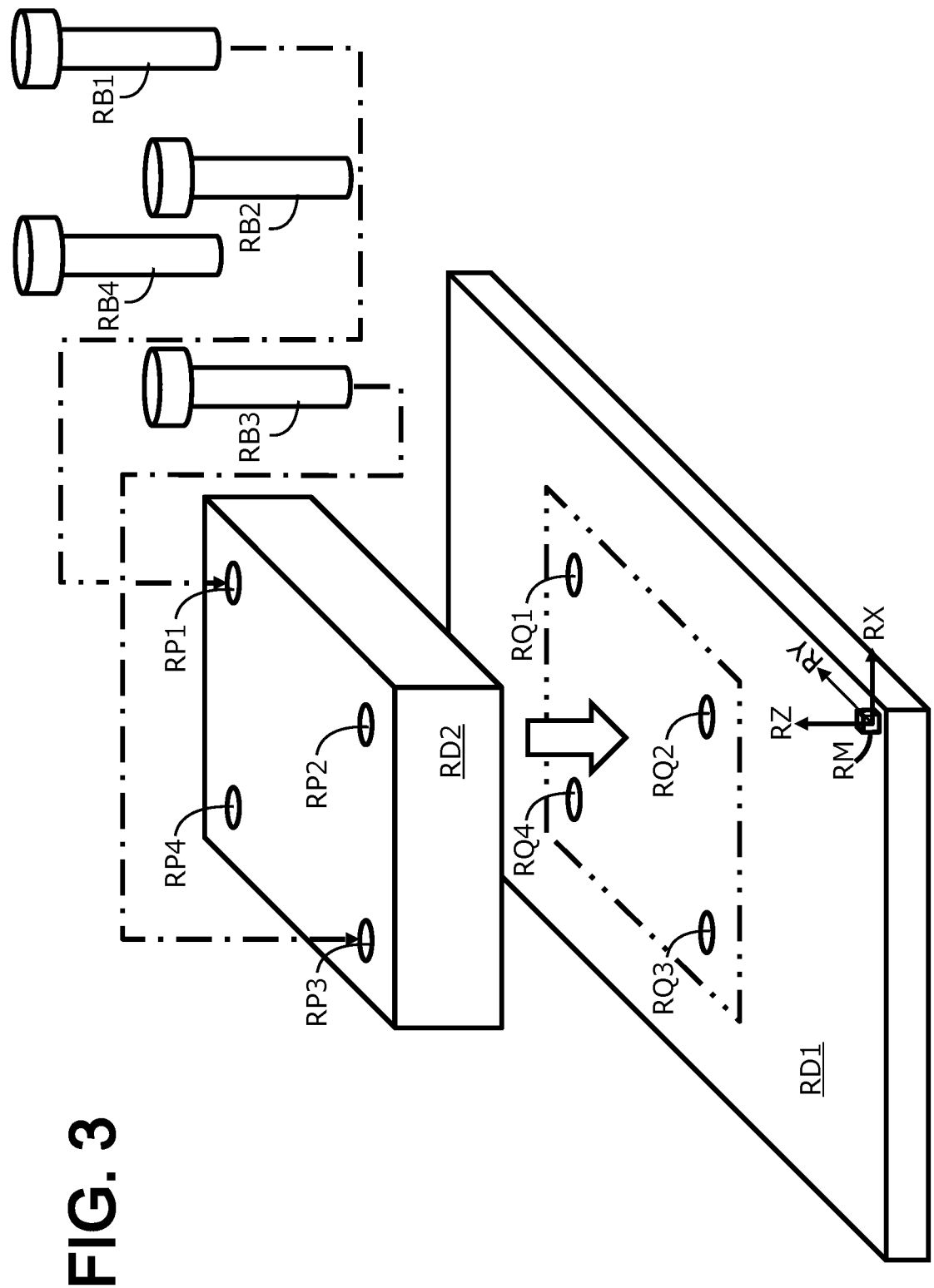
FIG. 3 is a diagram illustrating an example of an assembly operation including fastening, for illustrating the mechanical fastening unit management method using augmented reality of the invention.

FIG. 3 is a diagram illustrating an example of an assembly operation including fastening, for illustrating the mechanical fastening unit management method using augmented reality of the invention. The assembly operation is an operation of fixing a real component RD2 to a real base RD1 by four real bolts RB1 to RB4 (hereinafter, referred to as RBn (n=1 to 4) or simply as RBn) in a real space. The real base RD1 has real screw holes RQ1 to RQ4 having screw grooves into which the real bolts RBn passing through the real component RD2 are screwed, and a real position marker RM indicating a reference position of the real space. The real component RD2 includes real through holes RP1 to RP4, through which the real bolts RBn pass in a vertical direction, at four corners thereof.

Figure 4:
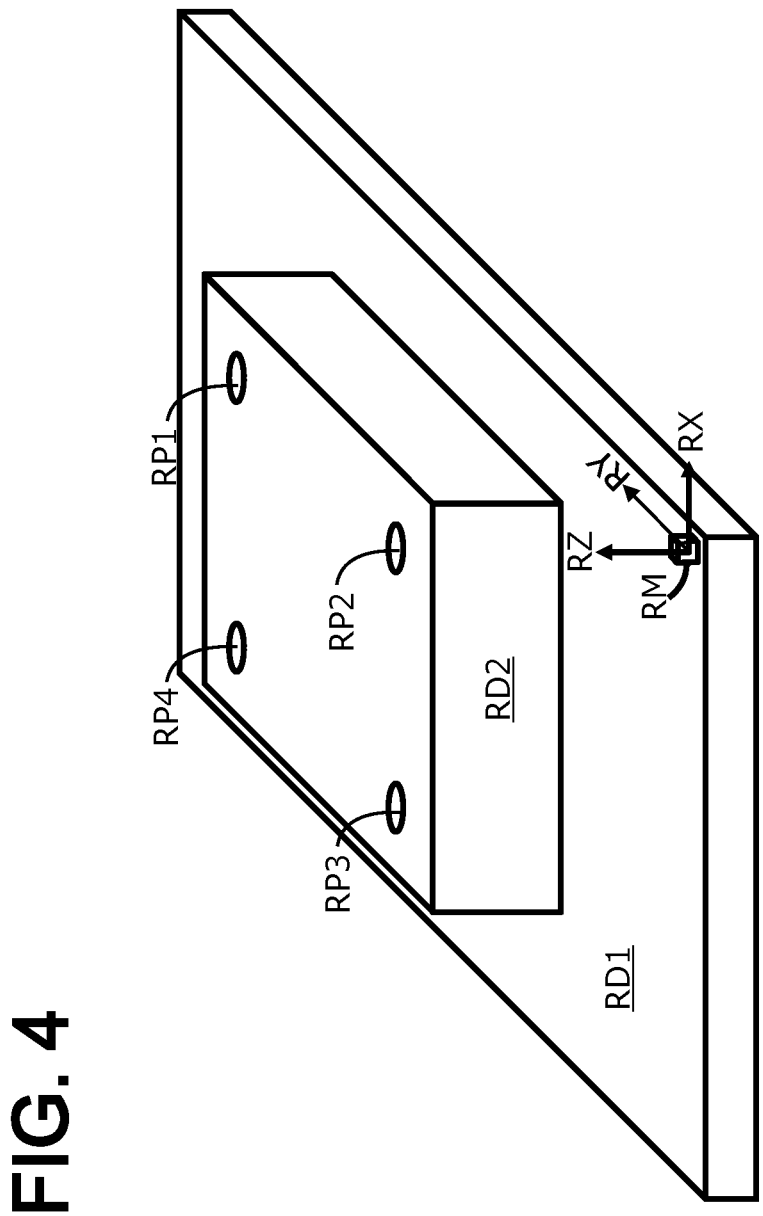
FIG. 4 is a schematic diagram illustrating a state in which a component is positioned on a base in a real space, which is a step included in the assembly operation of FIG. 3.
Figure 5:
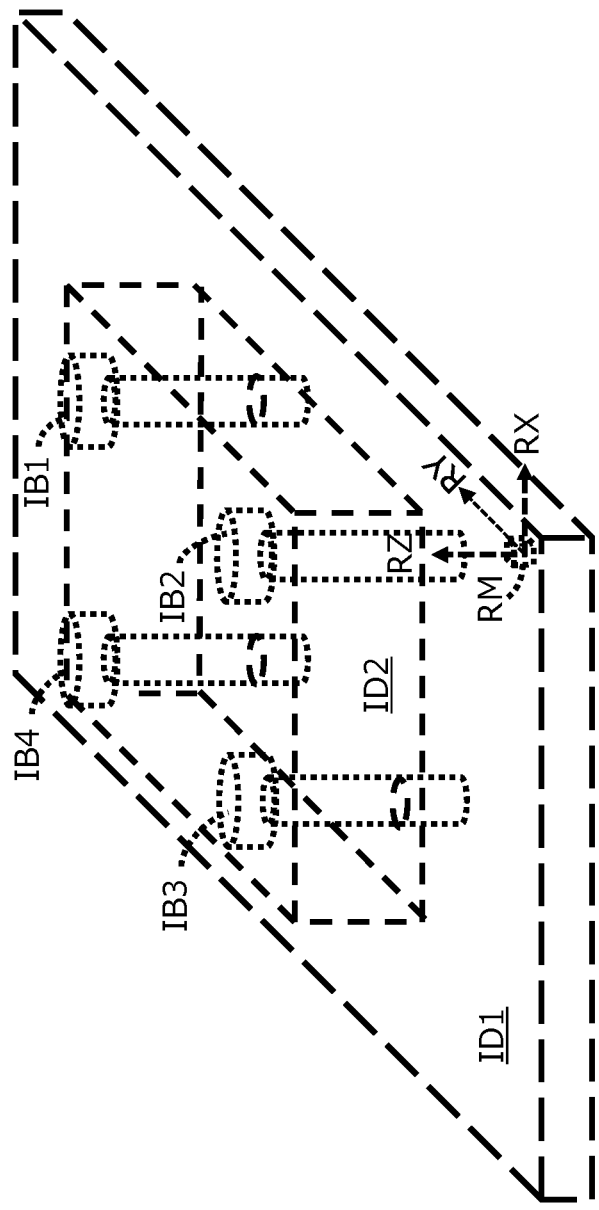
FIG. 5 is a schematic diagram illustrating a state in which the component is fixed to the base by bolts in a virtual space, which is a final step of the assembly operation of FIG. 3.
Figure 6:
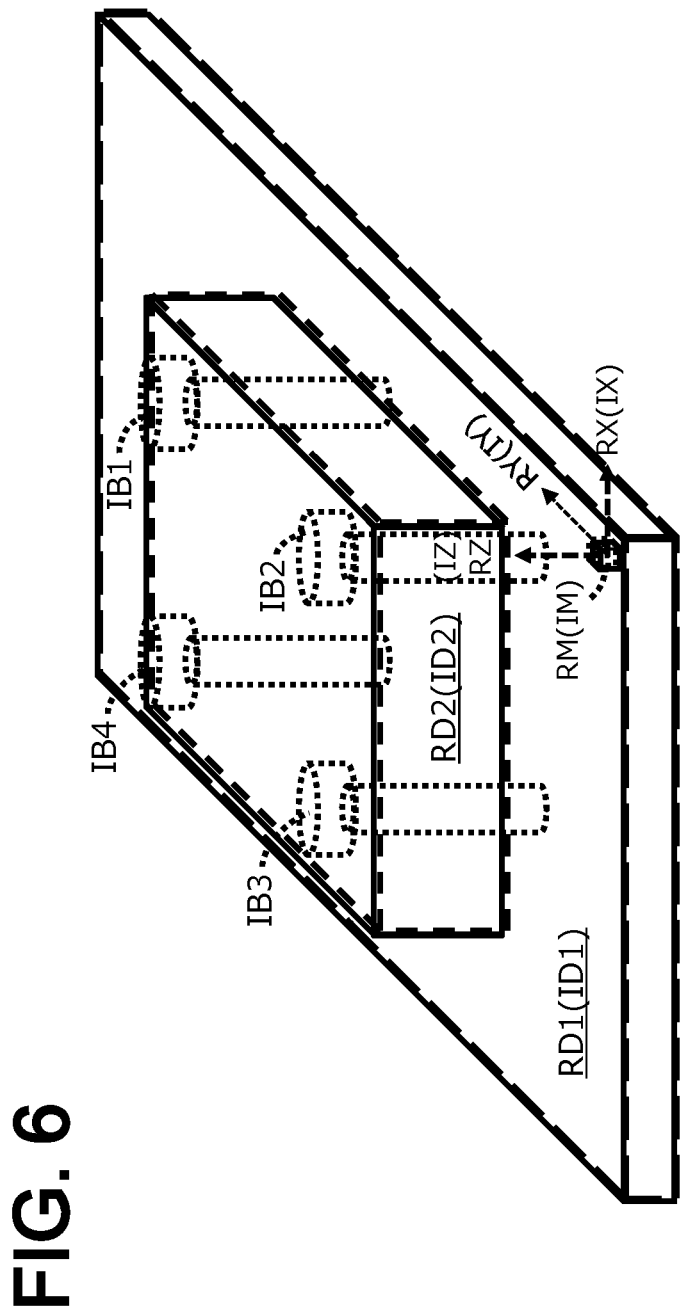
FIG. 6 is a schematic diagram illustrating a completed state in which the component is fixed to the base by the bolts in an augmented reality space created by superimposing the virtual space of FIG. 5 onto the real space of FIG. 4, which is a step included in the assembly operation of FIG. 3.

Outline of Fastening Unit Management in Augmented Reality Space Formed by Superimposing Virtual Space onto Real Space FIG. 4 is a schematic diagram illustrating a state in which a component is positioned on abase in a real space, which is a step included in the assembly operation of FIG. 3. FIG. 5 is a schematic diagram illustrating a state in which the component is fixed to the base by bolts in a virtual space, which is a final step of the assembly operation of FIG. 3. FIG. 6 is a schematic diagram illustrating a state in which the operation of fixing the component to the base by the bolts is completed in an augmented reality space that is obtained by projecting the virtual space of FIG. 5 onto the real space of FIG. 4, which is a step included in the assembly operation of FIG. 3.

FIG. 4 is a diagram, which illustrates an image of the real space obtained by the operator's own vision and in which the real component RD2 is positioned at a fixing position on an upper surface of the real base RD1. FIG. 5 is a diagram illustrating a state (assembly drawing of 3D-CAD data) after a virtual component ID2 is attached to a virtual base ID1 by virtual bolts IB1 to IB4 (hereinafter referred to as IBn (n=1 to 4) or simply as IBn) in a virtual space (digital space). The 3D-CAD data may be stored in the design information server 22, or in the augmented reality server 12 of the wearable device 7.

FIG. 6 is a schematic diagram illustrating a completed state in which the component is fixed to the base by the bolts in an augmented reality space created by superimposing the virtual space of FIG. 5 onto the real space of FIG. 4, which is a step included in the operation of FIG. 3.

In order to project an image (corresponding to FIG. 6) of the created augmented reality space onto the transmission type screen 14, the augmented reality server 12 first images (acquires) a state (corresponding to FIG. 4), in which the real component RD2 is positioned on the real base RD1, with the camera 10. Next, the augmented reality server 12 acquires 3D-CAD data (assembly drawing) of a virtual space from the design information server 22. Then, the augmented reality server 12 creates an augmented reality space by superimposing the 3D-CAD data based on the virtual space onto the imaged real space.

At this time, the augmented reality server 12 can easily create the augmented reality space if a reference point IM of the virtual space at one end of the virtual base ID1 is superimposed onto the reference point RM of the real space provided in advance at one end of the real base RD1. The augmented reality server 12 projects the created augmented reality space onto the transmission type screen 14. However, at this time point, the real bolt RBn is not yet inserted into the through hole RPn of the real component RD2.

Figure 7:
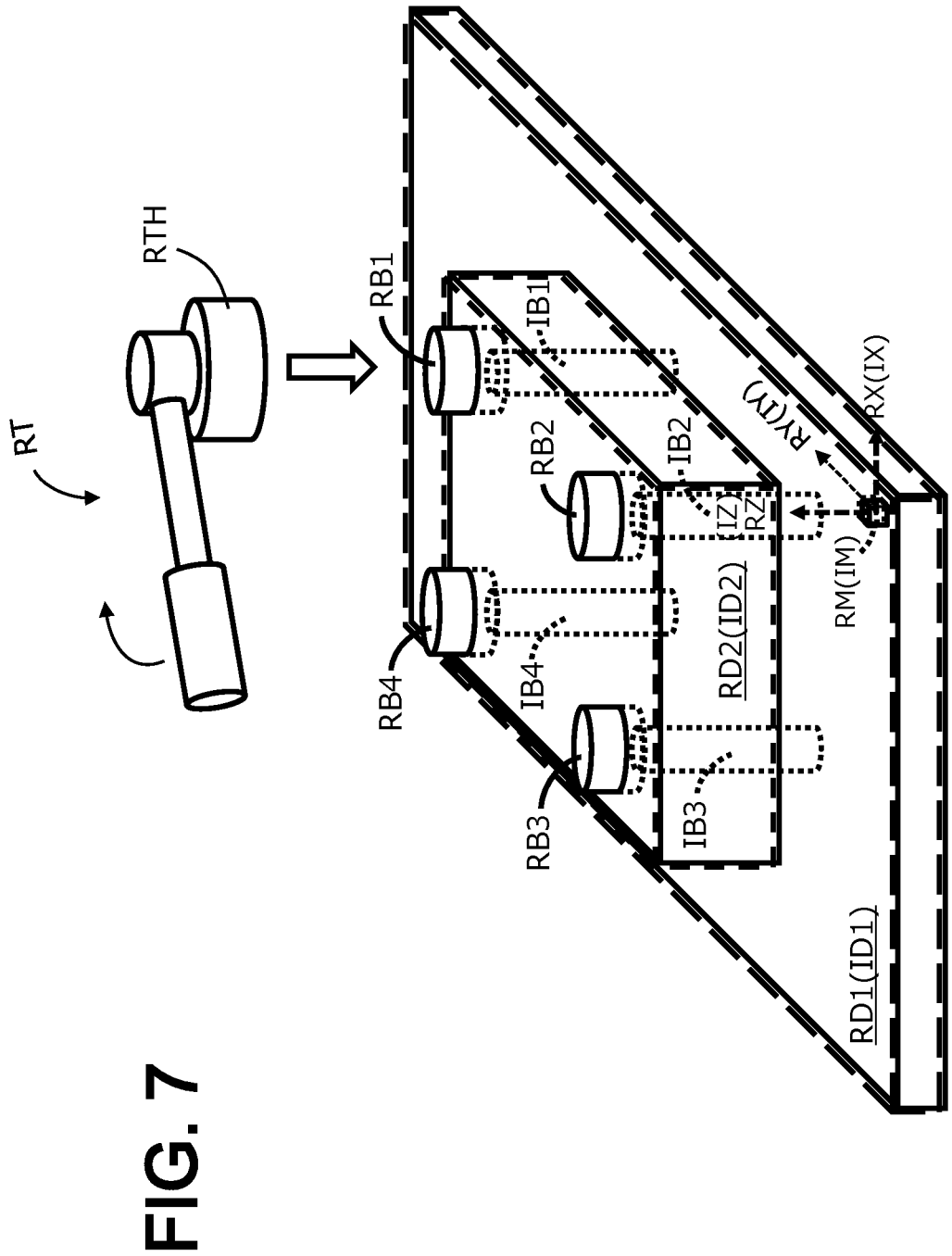
FIG. 7 is a schematic diagram illustrating a state in which bolt fastening management is started from a state in which real bolts are inserted into through holes of a real component in the augmented reality space of FIG. 6.

FIG. 7 is a schematic diagram illustrating a state in which bolt fastening management is started from a state in which the real bolts are inserted into the through holes of the real component in the augmented reality space of FIG. 6. FIG. 7 is a diagram illustrating a state in which the real bolt RBn is inserted into the real through hole RPn of the real component RD2 constituting the augmented reality space (corresponding to FIG. 6) projected onto the transmission type screen 14. Since a screw portion of a body of the real bolt RBn is not screwed into a real screw hole RQn of the real base RD1, a head portion of the real bolt RBn protrudes in a height direction as compared with a head portion of the virtual bolt IBn.

Since the augmented reality space is created by superimposing the reference point IM of the virtual space onto the reference point RM of the real space, the real bolt RBn inserted into the real through hole RPn of the real component RD2 is in a one-to-one correspondence (overlaps) with the virtual bolt IBn of the virtual space. That is, coordinates (for example, coordinates of a head center of the bolt) of the real bolt RBn of the real space substantially overlap with coordinates of the virtual bolt IBn of the virtual space.

However, in a case of FIG. 7, since the real bolt RBn is not screwed into the real screw hole RQn of the real base RD1, coordinates on an RX-RY plane of the real bolt RBn overlap with coordinates on an IX-IY plane of the virtual bolt IBn, but a coordinate on an RZ axis of the real bolt RBn does not overlap with a coordinate on an IZ axis of the virtual bolt IBn.

Although it has been described that the virtual reality space is generated by superimposing the virtual reference point IM of the virtual base onto the real reference point RM provided on the real base RD1 when generating the virtual reality space described above, it is not always necessary to prepare the real reference point RM and the virtual reference point IM. Instead of these reference points, for example, a virtual space may be superimposed onto a real space using one of the four corners of the real base RD1 and one of the four corners of the virtual base ID1 as reference points to generate an augmented reality space.

Fastening Unit Management Using Augmented Reality

Figure 8:
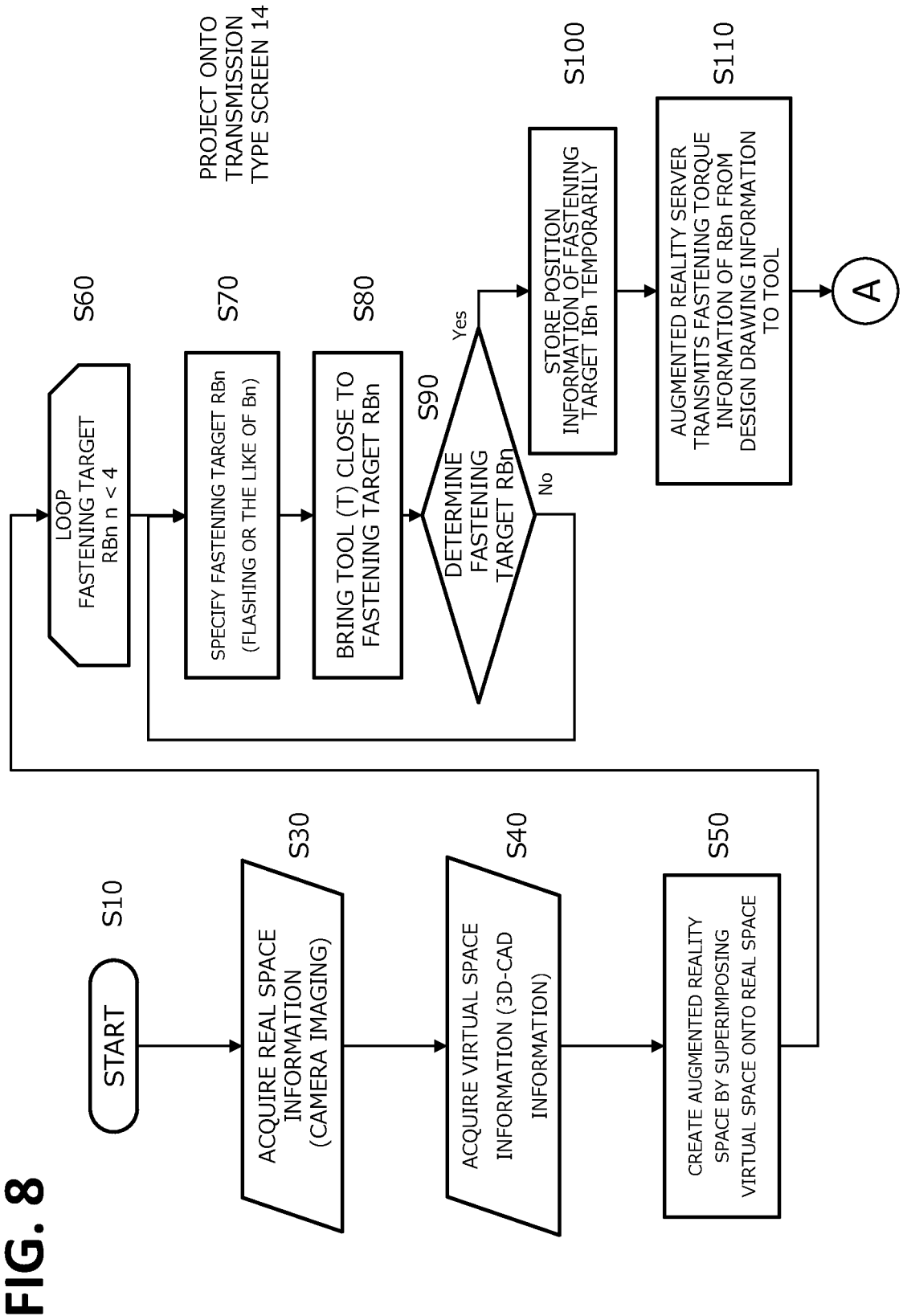
FIG. 8 is a flowchart (first half) illustrating the mechanical fastening unit management method using augmented reality of the invention.
Figure 9:
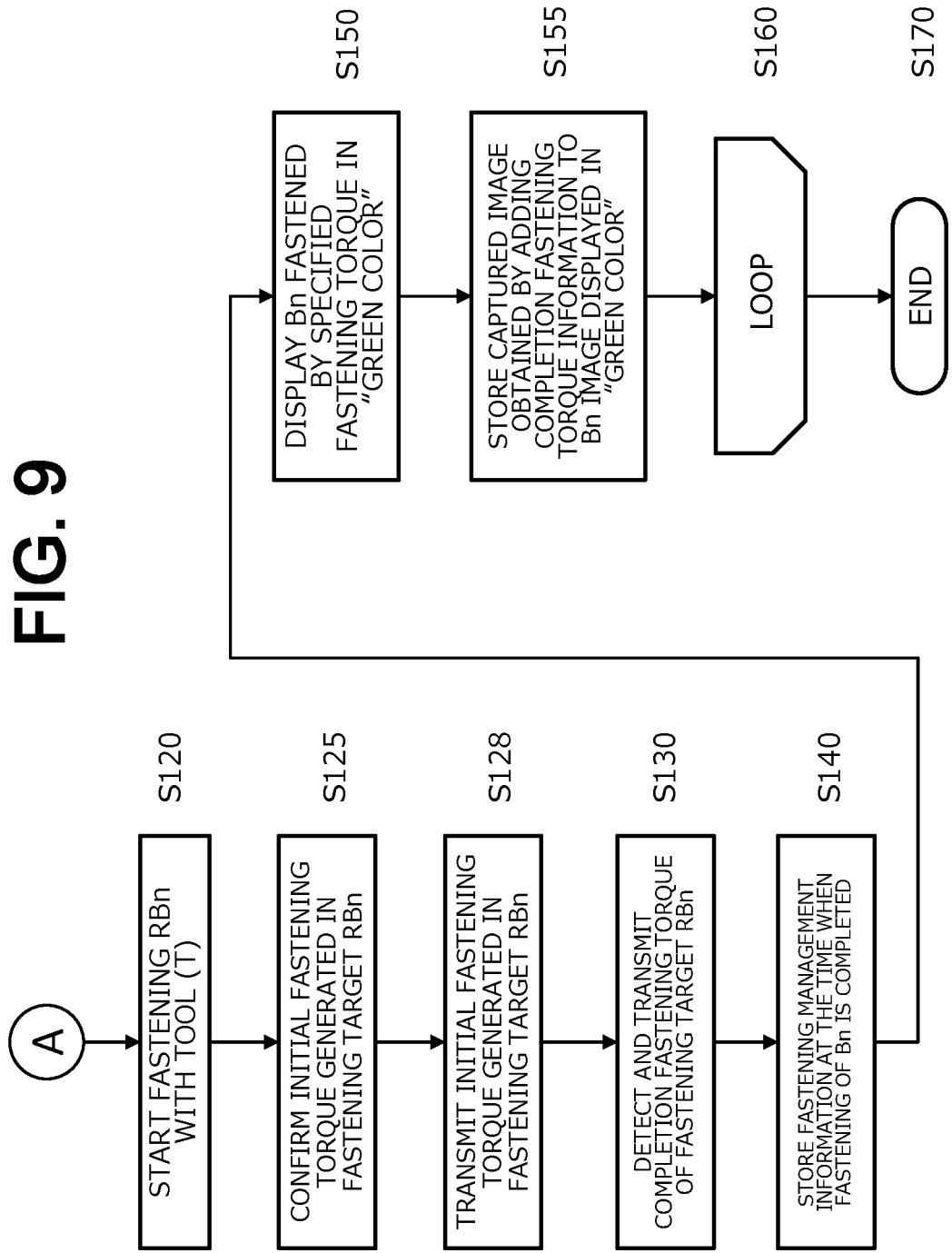
FIG. 9 is a flowchart (second half) illustrating the mechanical fastening unit management method using augmented reality of the invention.

FIGS. 8 and 9 are flowcharts (first half and second half) illustrating the mechanical fastening unit management method using augmented reality of the invention. Hereinafter, taking the operation illustrated in FIG. 3 as an example, the management method using augmented reality at the time when an operator wearing the wearable device 7 (headgear) fastens the bolt from the state of FIG. 7 in the augmented reality space will be described step by step.

In step 10 (S10), the fastening unit management using augmented reality is started.

In step 30 (S30), the augmented reality server 12 images the real component RD2 positioned on the upper surface of the real base RD1 with the camera 10, and acquires real space information (corresponding to FIG. 4).

In step 40 (S40), the augmented reality server 12 acquires virtual space information (3D-CAD information, corresponding to FIG. 5) from the design information server 22 via the network 5. When the virtual space information (corresponding to FIG. 5) is stored in the augmented reality server 12, the augmented reality server 12 acquires the virtual space information (corresponding to FIG. 5) from the augmented reality server 12.

In step 50 (S50), the augmented reality server 12 creates an augmented reality space by superimposing the virtual space information obtained in step 40 onto the real space information obtained in step 30. At this time, since the reference point RM of the real space and the reference point IM of the virtual space overlap with each other, all coordinates (RXn, RYn, RZn) of the real space overlap in a one-to-one correspondence with all coordinates (IXn, IYn, IZn) of the virtual space.

Processing from step 60 (S60) to step 160 (S160) is loop processing in which the number of bolts is the number of loops.

In step 70 (S70), the augmented reality server 12 specifies an order in which all of the virtual bolts IBn are to be fastened, based on the virtual space information acquired in S50, in the augmented reality space, and shows a bolt to be fastened to the operator. A method of showing the operator the virtual bolt specified in the order of fastening can be, for example, changing a color of the specified virtual bolt IBn or displaying the specified virtual bolt IBn in a flashing manner in the augmented reality space projected on the transmission type screen 14 for the operator.

In step 80 (S80), the operator brings the real tool RT close to the real bolt RBn onto which the virtual bolt IBn shown in S70 is superimposed, and covers a socket portion RTH of the real tool RT on the head portion of the real bolt RBn.

Figure 10:
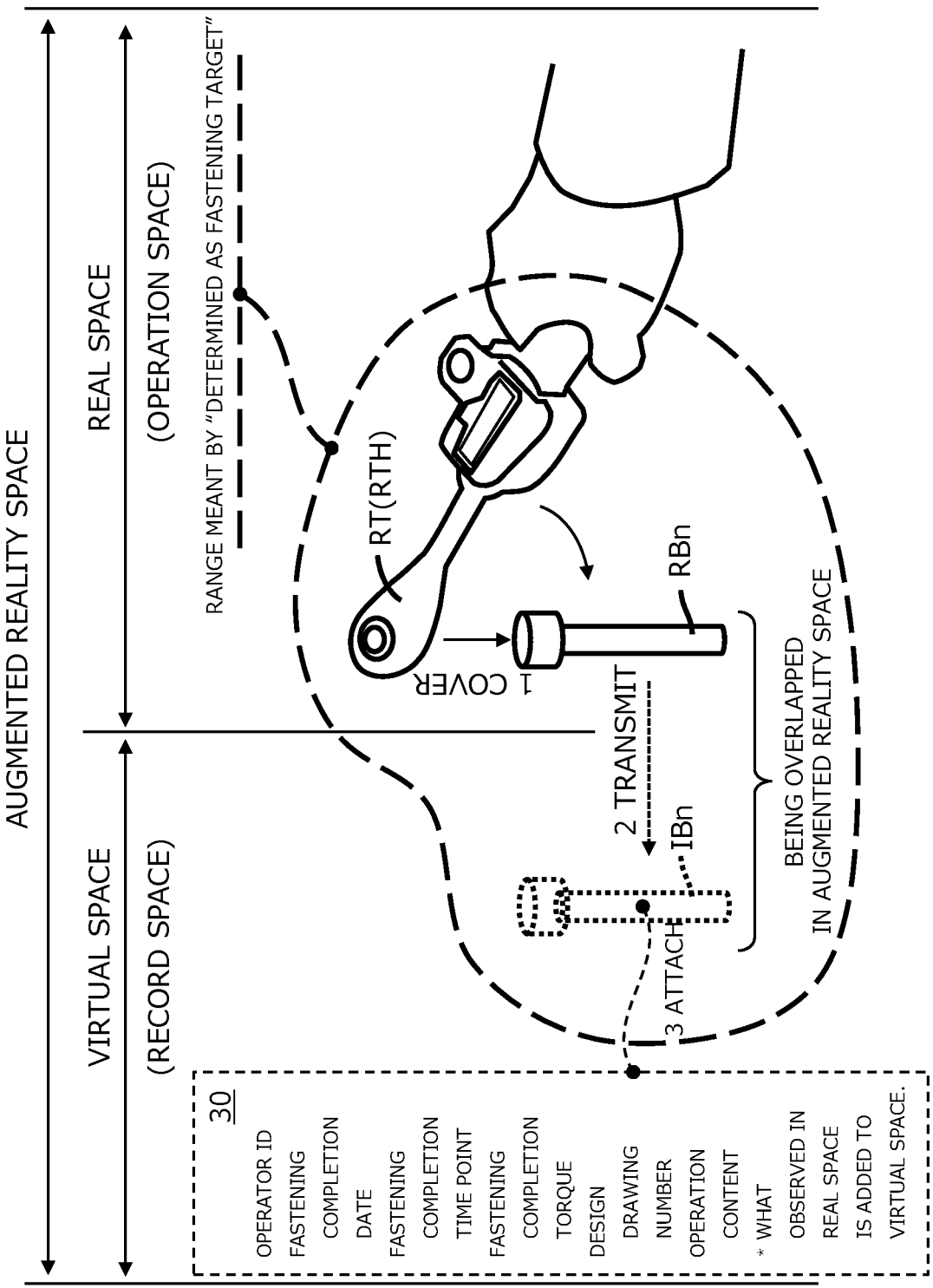
FIG. 10 is a schematic diagram illustrating a range meant by "determined as a fastening target" in which information that a bolt is covered by a tool so as to be selected as a fastening target in a real space is transmitted to a bolt in a virtual space.

In step 90 (S90), in the augmented reality space projected on the transmission type screen 14, the operator confirms that the socket portion RTH of the real tool overlaps with the real bolt RBn to be fastened, and thereafter completes an operation that the real bolt RBn to be fastened is "determined as a fastening target" with the real tool RT. FIG. 10 shows a schematic diagram illustrating the range meant by "determined as a fastening target". Although the real bolt RBn in FIG. 10 substantially overlaps with the virtual bolt IBn in the augmented reality space, the real bolt RBn and the virtual bolt IBn in the drawing are separately depicted for easy understanding. Based on an instruction in S70, the operator puts the real tool RT (head portion RTH) on the real bolt RBn to be fastened in the real space in S80.

In S50, since it is confirmed that all coordinates (RXn, RYn, RZn) of the real space including the coordinates of the real bolt RBn overlap in a one-to-one correspondence with all coordinates (IXn, IYn, IZn) of the virtual space including the coordinates of the virtual bolt IBn, information of the real bolt RBn "selected as a fastening target by superimposing the real tool RT" is transmitted to the virtual bolt IBn. Therefore, "determined as a fastening target" means information that the real bolt RBn is covered by the real tool RT so as to be selected as the fastening target, is transmitted to the virtual bolt IBn in a one-to-one correspondence with the real bolt RBn.

When the real bolt RBn of a fastening target object is not determined in S90, the process returns to S70, and the real bolt RBn of a fastening target object is determined again. When the real bolt RBn of a fastening target object is determined in S90, the process proceeds to the next step.

In step 100 (S100), the augmented reality server 12 temporarily stores coordinates IBO (IBX1, IBY1, IBZ1) in the virtual space of the virtual bolt IBn in a one-to-one correspondence with the real bolt RBn determined as the fastening target, to the augmented reality server 12 (or any server such as the operation information server 26).

In step 110 (S110), the augmented reality server 12 acquires fastening torque information of the real bolt RBn from the design information server 22 or the torque management server 28 (any server), and transmits the fastening torque information to the real tool RT. The fastening torque information is specified according to a bolt size, a bolt material, a usage environment, and the like, and is a fastening torque (N·m) for generating a required (specified) axial force AFS. When the real bolt RBn is fastened, an axial force AF generated in the real bolt RBn is proportional to the fastening torque. Since it is not easy to directly observe the axial force AF, a fastening status of the real bolt RBn is managed according to a fastening torque T corresponding to the axial force, instead of the axial force AF of the real bolt RBn. Hereinafter, the fastening torque is referred to as a specified fastening torque TS.

In step 120 (S120), the operator starts fastening the real bolt RBn determined as the fastening target with the real tool RT.

In step 125 (S125), when the operator starts fastening the real bolt RBn determined as the fastening target with the real tool RT, the real tool RT detects generation of the fastening torque. At this time, the augmented reality server 12 performs image analysis on an image captured by the camera 10, and confirms whether coordinates RTHO (RTHX1, RTHY1, RTHZ1) of the head portion RTH of the real tool and coordinates RBO (RBOX1, RBOY1, RBOZ1) of the real bolt RBn determined as the fastening target overlap with each other or are close enough to be determined as overlapping with each other. By step S125, it can be confirmed that the real bolt RBn determined as the fastening target is started to be fastened with the real tool RT.

In step 128 (S128), the real tool RT transmits a detected initial fastening torque TB to the augmented reality server 12. The real tool RT may grasp information on date and time when the initial fastening torque TB is detected, and transmit the data and time information together with the initial fastening torque TB to the augmented reality server 12. The augmented reality server 12 having received the initial fastening torque TB may store the date and time information together with the initial fastening torque TB, as a part of fastening management information 30 of the virtual bolt IBn in the virtual space corresponding to the real bolt RBn determined as the fastening target, in any server.

In step 130 (S130), when the operator continues to fasten the real bolt RBn of the fastening target object with the real tool RT, the fastening torque observed in the real bolt RBn reaches the specified fastening torque TS. When the fastening torque observed in the real bolt RBn of the fastening target reaches the specified fastening torque TS received from the augmented reality server 12 in S110, the real tool RT notifies the operator, by operations such as flashing LED of the display unit provided in the real tool RT or changing color of the display unit, that the real bolt RBn is fastened with the specified fastening torque.

The specified fastening torque TS has an adequate range from a lower limit value (TSL) to an upper limit value (TSH), and the display unit provided in the real tool RT can display a fastening torque TL by color coding for the lower limit value TSL of the adequate range or less, the adequate range, and the upper limit value TSH of the adequate range or more. Instead of the operations of the display unit provided in the real tool RT, these pieces of information may be displayed on the transmission type screen 14, or may be displayed on a display unit of another wearable terminal provided on the wrist or the like of the operator.

The real tool RT transmits, to the augmented reality server 12, a completion fastening torque TL observed when the operator finishes the fastening operation. The completion fastening torque TL is a value substantially the same as or slightly larger than that of the specified fastening torque TS. The real tool RT may grasp information on date and time information when the completion fastening torque TL is detected, and send the date and time information together with the completion fastening torque TL to the augmented reality server 12. The augmented reality server 12 having received the completion fastening torque TL may add the date and time information described above to the completion fastening torque TL.

In step 140 (S140), the augmented reality server 12 having received the completion fastening torque TL transmits the completion fastening torque TL to the torque management server 28 via the augmented reality server 12 itself or the network 5, and the torque management server 28 stores the completion fastening torque TL.

In step 150 (S150), the augmented reality server 12 changes a display color of the virtual bolt IB1, which is displayed on the transmission type screen 14, in a one-to-one correspondence with the real bolt RB1 on which the fastening is completed, to a color different from those of the other virtual bolts IB2 to IB4 on which the fastening operation is not completed. The operator can distinguish a virtual bolt on which the fastening is finished (completed) from a virtual bolt on which the fastening operation is not completed, by a difference in displayed colors.

In step 155 (S155), the augmented reality server 12 displays the fastening management information 30 such as an operator ID, a fastening completion date, a fastening completion time point, and a design drawing number, on the transmission type screen 14 in the vicinity of the virtual bolt IB1 whose display color is changed in S150 and on which the fastening is finished (completed).

The augmented reality server 12 captures (hard copy of a screen of the transmission type screen 14) an image (a still image or a moving image) including the fastening management information 30 displayed on the transmission type screen 14 such as the operator ID, the fastening completion date, the fastening completion time point, or the design drawing number in relation to the fastening operation on the real bolt RB1 in a one-to-one correspondence with the virtual bolt IB1. The captured image is stored in the operation information server 26 or the torque management server 28 via the augmented reality server 12 or the network 5.

Instead of the captured still image, a moving image of the fastening operation may be stored, which lasts for a predetermined time before the fastening completion time point and lasts for a predetermined time after the fastening completion time point with the fastening completion time point as a reference. In the moving image, a state in which the real bolt RBn is fastened at the specified fastening torque TS and the real tool RT notifies the operator of the completion of the fastening via the display unit is also recorded in addition to the fastening management information 30.

In step 160 (S160), the process is returned to S50 to repeat the loop by the number of predetermined fastening target bolts.

In step 170, a series of operations related to bolt fastening management using augmented reality related to the fastening operation of the real bolt RBn is ended.

Figure 11:
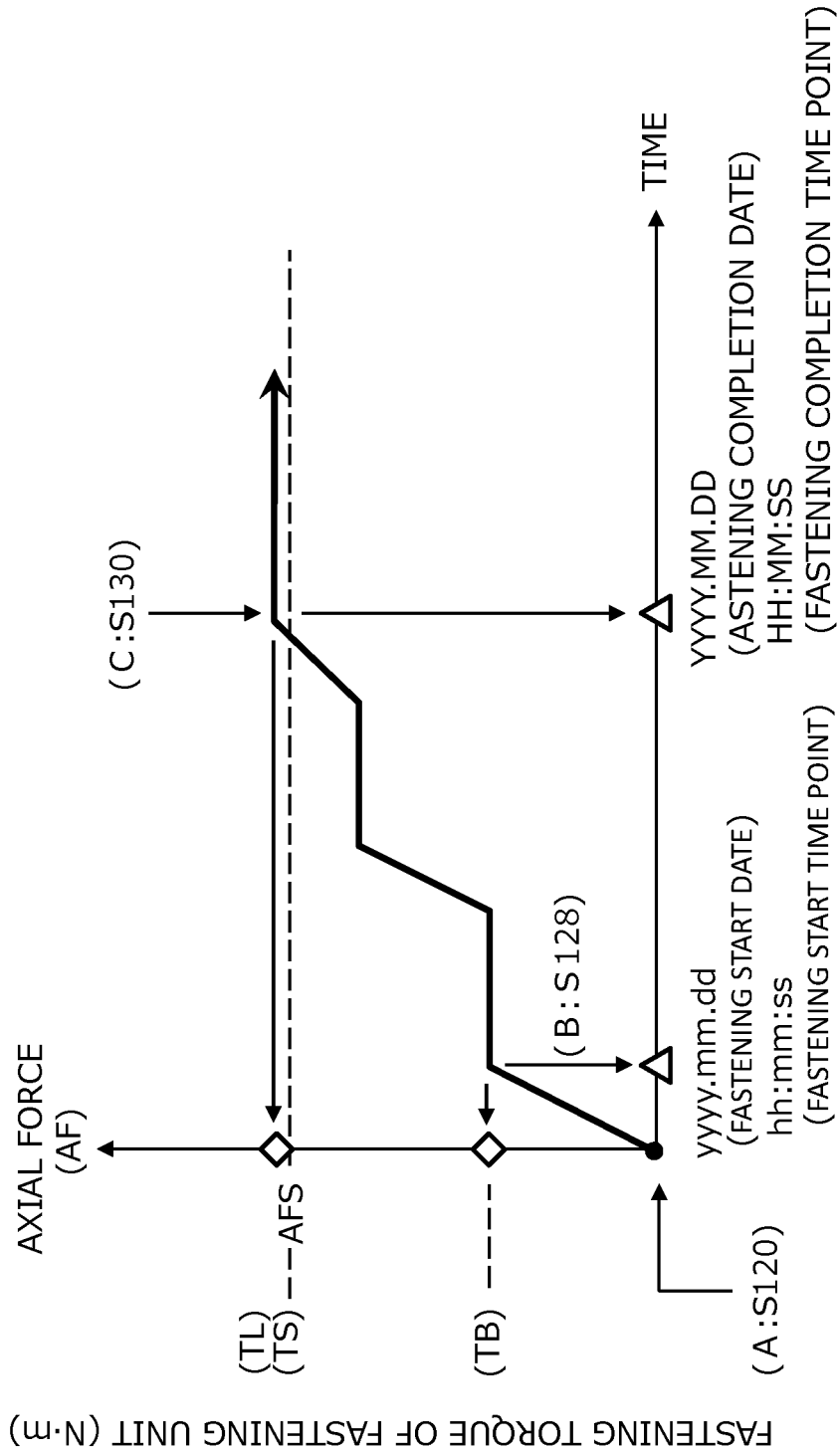
FIG. 11 is a schematic graph illustrating a relationship between transition of a fastening torque observed when a bolt is fastened with a tool and specific steps of the flowchart.

FIG. 11 is a schematic graph illustrating a relationship between transition of a fastening torque observed when a bolt is fastened with a tool and specific steps of the flowchart. A horizontal axis of FIG. 11 is a time axis, and a vertical axis thereof is the fastening torque observed in the real bolt RBn when the real bolt RBn is fastened with the real tool RT.

FIG. 11 illustrates the transition of the fastening torque observed in a course from the operator starting fastening the real bolt to completing the fastening. In FIG. 11, the horizontal axis represents time, and the vertical axis represents the axial force AF generated in the real bolt RBn. In the axial force AF, an inclined portion observed when the operator starts fastening the real bolt RBn with the real tool RT and a horizontal portion observed when the operator returns the real tool RT are alternately observed by the number of fastening times. The horizontal portion indicates a step in which the real tool RT is returned in preparation for further fastening, and the fastening torque is not observed.

Correspondingly to an axial force observed at a first horizontal portion, the initial fastening torque TB is detected, and correspondingly to an axial force observed at a third horizontal portion, the completion fastening torque TL is detected. Further, at a terminal end portion of a third inclined portion immediately before reaching the third horizontal portion, the specified axial force AFS is generated and the specified fastening torque TS corresponding to the specified axial force AFS is observed.

Next, the flowchart illustrated in FIG. 9 is used for description. S120 of the flowchart illustrated in FIG. 9 corresponds to a point A (A: S120) of FIG. 11 that is at a time point when the operator starts fastening the real bolt RBn of fastening target object with the real tool RT in FIG. 11. S125 of FIG. 9 corresponds to a point B (B: S128) where the initial fastening torque TB is observed after fastening of the real bolt RBn with the real tool RT is started from S120 of the flowchart described above. S130 of FIG. 9 corresponds to a point C (C: S130) that is at a time point when the fastening of the real bolt RBn with the real tool RT at the specified fastening torque TS is completed.

Figure 12:
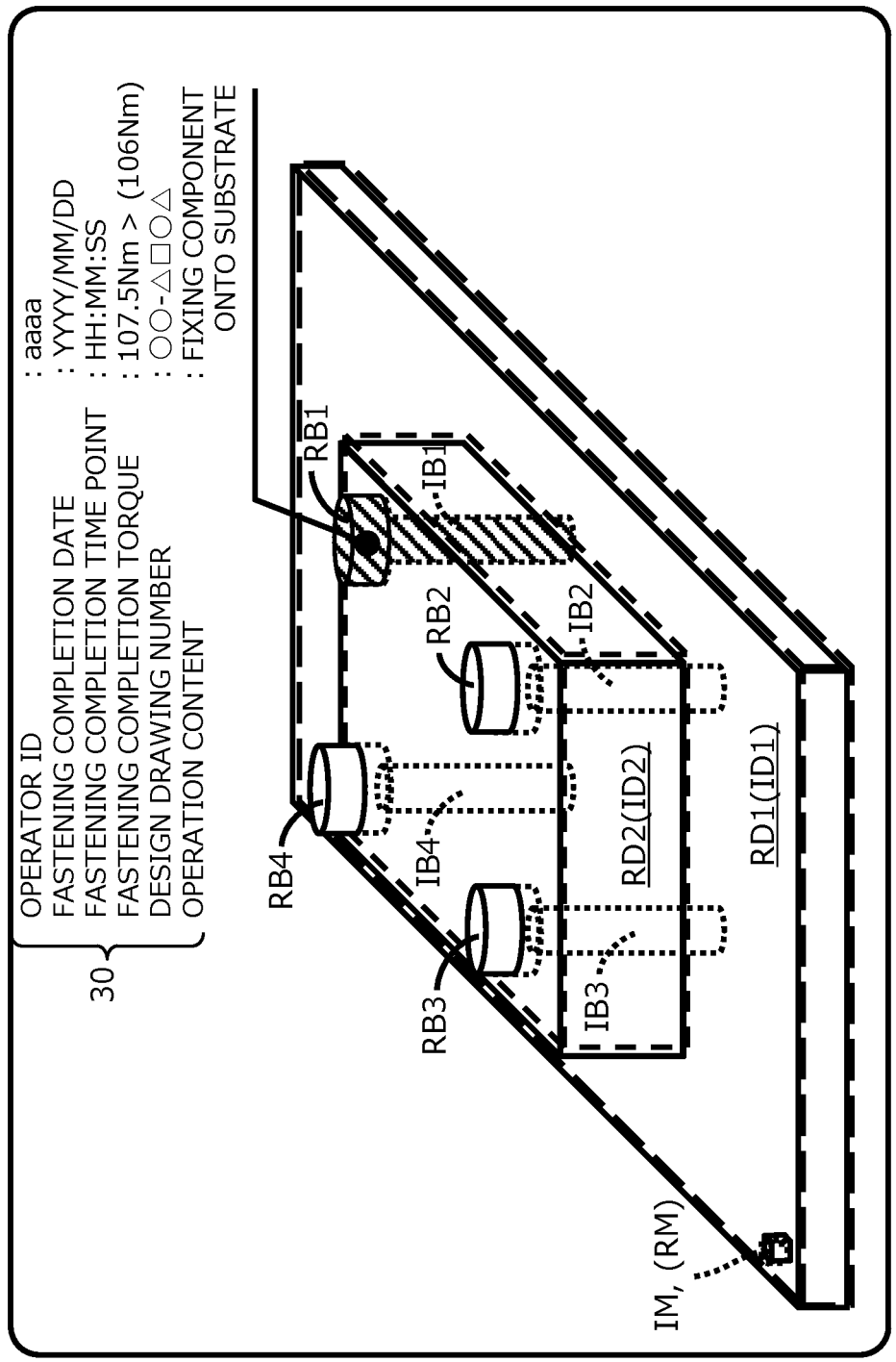
FIG. 12 is a schematic diagram illustrating a captured image of an augmented reality space, which is displayed on a transmission type display including both a bolt changed to a display color indicating completion of fastening and fastening management information displayed in the vicinity of the bolt.

FIG. 12 is a schematic diagram illustrating a captured image of an augmented reality space, which is displayed on a transmission type display including both a bolt changed to a display color indicating completion of fastening and fastening management information displayed in the vicinity of the bolt. FIG. 12 simulates S155 of the flowchart of FIG. 9, and illustrates a final step of a first loop repeated from S60 to S160 by the number of bolts RBn.

At this time, since only fastening of the real bolt RB1 is completed, only the head portion of the real bolt RB1 sinks downward relative to other real bolts RB2 to RB4 and overlaps with the head portion of the virtual bolt IB1. Since only a display color of the real bolt RBn on which the fastening is completed is changed to a gray color, the operator can easily distinguish the fastening completed bolt RB1 from the unfastened bolts RB2 to RB4 on which the fastening is not completed, and it is possible to prevent forgetting to perform the fastening operation. In the augmented reality space, an image obtained by adding the fastening management information 30 such as the operator ID, the fastening completion date, the fastening completion time point, the completion fastening torque, and the design drawing number, to an image in which only fastening of the real bolt RB1 is completed is captured (hard copy of an image, or a print screen) and stored in any server.

Effects (FIG. 12)

By creating the image illustrated in FIG. 12, it is possible to instantaneously grasp that the real bolt RB1 is fastened at the specified fastening torque by whom (which operator), based on which design drawing and instructed by what operation content.

In general, an image (corresponding to FIG. 7) of the fastening target object in the augmented reality space, and the fastening management information 30 (such as the operator ID, the fastening completion date, the fastening completion time point, the completion fastening torque, and the design drawing number) associated with the fastening target object are stored as information related to (linked to or associated with) the virtual bolt IBn of the virtual space (for example, the torque management server 28). Further, as necessary, the fastening management information 30 of the virtual bolt IBn is called from the torque management server 28 or the like as related information of the virtual bolt IBn of the virtual space, and is presented to a requester by display in the augmented reality space.

When the related (linked, associated) information of the virtual bolt IBn and the fastening management information 30 associated with the virtual bolt IBn is damaged for some reason, the fastening management information 30 in a one-to-one correspondence with the fastening target object cannot be called, and it is extremely difficult to grasp a state that is based on the fastening operation performed on the fastening target object. Therefore, by acquiring and storing the image described in S155 of FIG. 9, the state based on the fastening operation performed on the fastening target object can be instantaneously grasped even when the linked (associated) information is damaged, and thus the traceability can be secured.

FIG. 13 is a table illustrating an example of design drawing information for attaching a component to a base, and FIG. 14 is a table illustrating an example of operation information for attaching a component to a base. The design drawing information is information included in an assembly drawing, for example, a drawing number, a drawing name, a device (component) name, a bolt size, a bolt body length, a bolt material, the specified fastening torque, and the number of bolts.

The operation information is, for example, an operation content (name), an operation date and time, design drawing information to be referred to, information on an scheduled operator working as the operator, information on a vehicle serving as an operation target, operation start time point, component information, operation place, and operation completion date and time.

Figure 15:
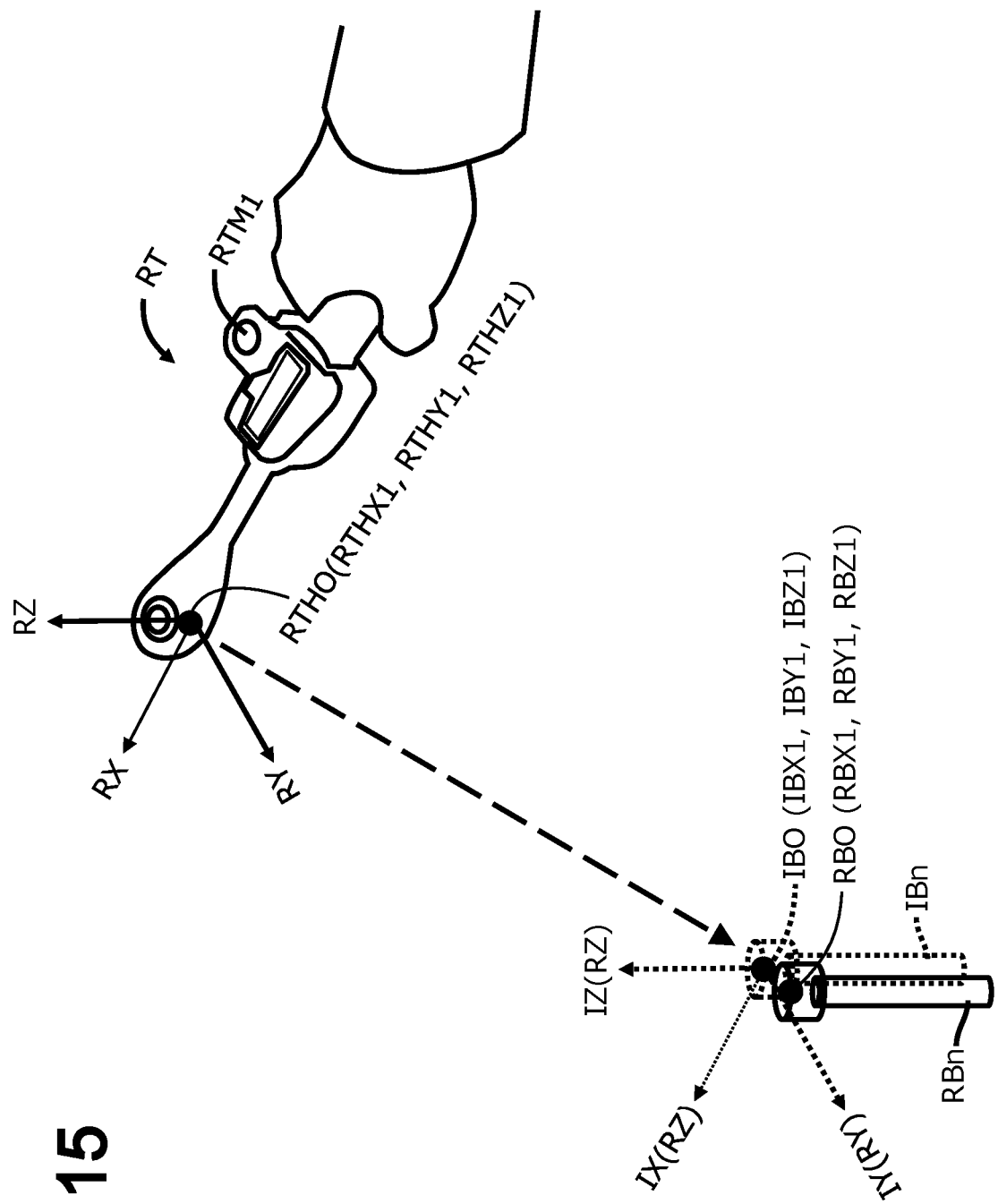
FIG. 15 is a diagram illustrating an example of a procedure (S90) in which a virtual bolt in a one-to-one correspondence with a real bolt is determined as a fastening target object to be fastened by a real tool in an augmented reality space.

FIG. 15 is a diagram illustrating an example of a procedure (S90) in which a virtual bolt in a one-to-one correspondence with a real bolt is determined as a fastening target object to be fastened by a real tool in an augmented reality space. When the mechanical fastening unit is to be managed using augmented reality, the fastening management information 30 is stored in the torque management server 28 or the like as information related to the virtual bolt IBn. For this reason, it is important to accurately associate the information on the real bolt RBn determined as the fastening target in the real space with the virtual bolt IBn in the virtual space in a one-to-one correspondence with the real bolt RBn, for managing the fastening unit using augmented reality.

Description of Procedure in Which Information on Selected Real Bolt Is Transmitted to the Virtual Bolt to Determine Fastening Target In S50 of FIG. 8, in the augmented reality space generated by superimposing the reference point RM of the real space and the reference point IM in the virtual space, all coordinates (RXn, RYn, RZn) of the real space are in a one-to-one correspondence with all coordinates (IXn, IYn, IZn) of the virtual space respectively. On a premise that the corresponding relationship is basically established, the procedure (S90), in which information related to the real bolt RBn covered by the head portion RTH of the real tool so as to be selected as the fastening target in the real space, is transmitted (inherited by) to the virtual bolt IBn corresponding to the real bolt RBn, to determine the fastening target, will be described in the following A1 to A7.

A: The augmented reality server 12 analyzes an image captured by the camera 10 in the real space, which corresponds to FIG. 7 and which includes the real bolt RBn, and calculates the coordinates RB) (RBX1, RBY1, RBZ1) of the real bolt RBn.

A2: The augmented reality server 12 calls a 3D model (for example, a device illustrated in FIG. 5) including the virtual bolt IBn, based on 3D-CAD data stored in advance in the virtual space, and acquires coordinates IBO (IBX1, IBY1, IBZ1) of a randomly selected virtual bolt IBn included in the 3D model.

A3: The augmented reality server 12 grasps that the coordinates RBO (RBX1, RBY1, RBZ1) of the real bolt RBn of the real space and the coordinates IBO (IBX1, IBY1, IBZ1) of the virtual bolt IBn of the virtual space overlap with each other or are close enough to be determined as overlapping with each other in the augmented reality space. A1 to A3 described above are a process of generating an augmented reality space by superimposing a virtual space onto a real space. By this understanding, in the augmented reality space, it is reconfirmed that a real bolt RBn is in a one-to-one correspondence with a virtual bolt IBn.

As illustrated in FIG. 7, when the real bolt RBn before completion of assembly is in a state of being inserted into the through hole RPn (n=1 to 4) of the real component RD2 in the real space, the head portion of the real bolt RBn that is not screwed into the real base RD1 does not overlap with the head portion of the virtual bolt IBn that is in a screwed state, and is at a position slightly deviated upward. For this reason, the X coordinate and the Y coordinate indicating a plane of coordinates of the real bolt RBn substantially overlap with those indicating a plane of coordinates of the virtual bolt IBn, but the Z coordinate indicating a height of the coordinate of the real bolt RBn does not coincide with that of the coordinate of the virtual bolt IBn. For this reason, a determination that the real bolt RBn and the virtual bolt IBn is close enough to be determined as overlapping with each other is added to determination of overlap between the real bolt RBn and the virtual bolt IBn, and the overlap between the real bolt RBn and the virtual bolt IBn is reconfirmed.

A4: The augmented reality server 12 grasps that the real bolt RBn is selected as the fastening target, based on a state imaged by the camera 10 in which the operator puts the head portion RTH of the real tool on a randomly selected real bolt RBn in the real space.

A5: In the real space, with a mark RTM1 (mark such as an LED lamp or a 2-D bar code) provided in the real tool TR as a reference point, which is imaged by the camera 10, the augmented reality server 12 geometrically calculates the coordinates RTHO (RTHX1, RTHY1, RTHZ1) of the head portion RTH of the real tool based on the reference point.

A6: In the real space, the augmented reality server 12 compares and verifies the coordinates RTHO (RTHX1, RTHY1, RTHZ1) of the head portion RTH of the real tool and the coordinates RBO (RBX1, RBY1, RBZ1) of the real bolt, and confirms that the coordinates RTHO of the head portion RTH of the real tool RT and the coordinates RBO of the real bolt overlap with each other or are in a range that can be determined as overlapping with each other. By this confirmation, it is confirmed that the randomly selected real bolt RBn is selected as the fastening target.

A7: Since the augmented reality server 12 confirms that the real bolt RBn (coordinates RBO) is in a one-to-one correspondence with the virtual bolt IBn (coordinates IBO) in A3, the augmented reality server 12 transmits the information on the real bolt RBn covered by the head portion RTH of the real tool so as to be selected as the fastening target in the real space, to the virtual bolt IBn in the virtual space.

By the above procedure, information on the real bolt RBn being selected as the fastening target is transmitted to the virtual bolt IBn in a one-to-one correspondence with the real bolt RBn, and additional information such as the fastening management information 30 can be stored in any server as information related to the virtual bolt IBn of the virtual space.

Further, by providing the configuration of A5, for example, even when the real bolt RBn cannot be imaged by the camera 10 since the real bolt RBn is hidden by a shielding object, the augmented reality server 12 can obtain the coordinates of the head portion RTH of the real tool RT, and thus the process can proceed to A7 following A6.

Figure 16:
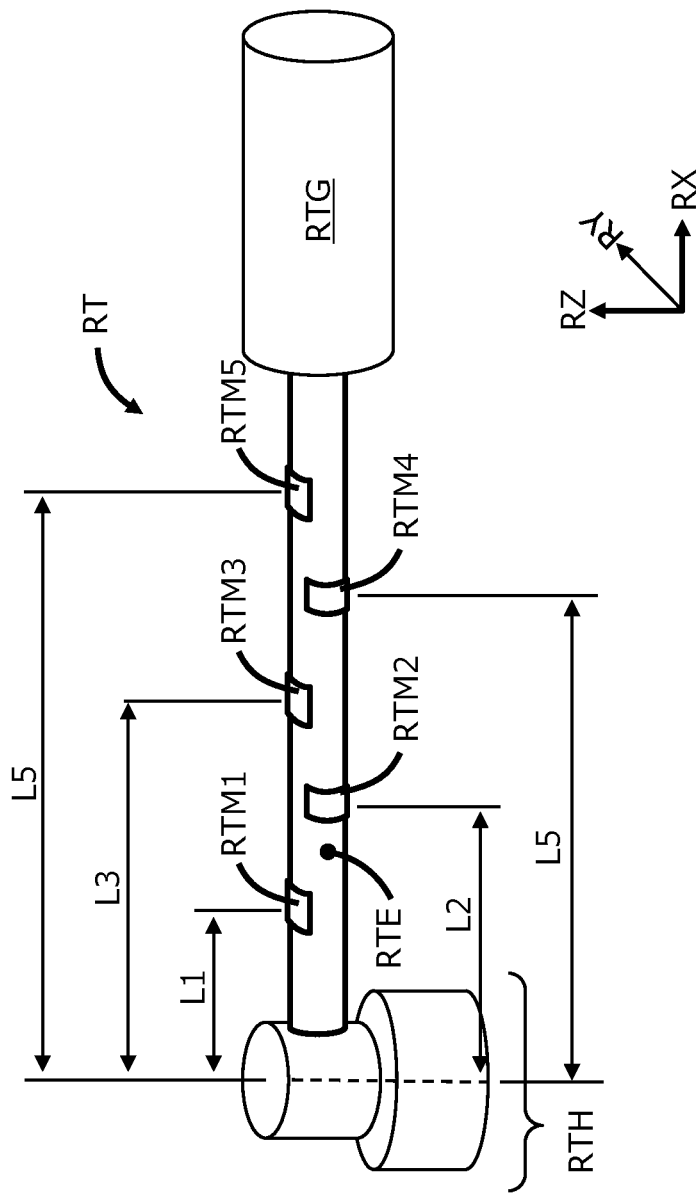
FIG. 16 is a diagram illustrating an example of a real tool including a plurality of marks indicating a position of a head (socket) portion of the tool.

FIG. 16 is a diagram illustrating an example of a real tool including a plurality of marks indicating a position of ahead (socket) portion of the tool. The real tool RT includes a head portion RTH to be covered on the head portion of the real bolt RBn, a grip portion RTG of the real tool to be held by the operator, and a handle portion RTE connecting the head portion RTH and the grip portion RTG. The mark RTM1, a mark RTM3, and a mark RTM5 are provided along an axial direction of the handle portion RTE, on an upper surface of the handle portion RTE of the real tool RT disposed in a posture when a vertically disposed real bolt RT is fastened. A mark RTM2 and a mark RTM4 are provided along the axial direction of the handle portion RTE, on a side surface of the handle portion RTE of the real tool RT held in the same posture.

The mark RTMn (n=1 to 5) has a code indicating a direction from each mark RTMn to the head portion RTH and indicating each of distances L1 to L5 from each mark RTMn to the head portion RTH. For this reason, for example, even when a range from the head portion RTH to the mark RTM2 is in a shadow of a shielding object and the head portion RTH cannot be imaged by the camera 10, the marks RTM3 to RTM5 can be imaged by the camera 10. For example, when the mark RTM3 can be clearly imaged by the camera 10, the augmented reality server 12 having received the image of the camera 10 can grasp that the head position RTH having an axis along an RZ direction exists at a position with a distance L3 in a –RX direction away from the code of the mark RTM3.

For this reason, the augmented reality server 12 can geometrically calculate the coordinates RTHO (RTHX1, RTHY1, RTHZ1) of the head portion RTH based on the information on the head portion RTH obtained based on the mark RTM3. Further, the mark RTMn (n=1 to 3) and the mark RTMn (n=2, 4) are provided at positions deviated by 90 degrees around the axis of the handle portion RTE.

For this reason, the augmented reality server 12 can obtain the coordinates of the head portion RTH by referring to the information on the mark RTMn (n=1 to 3) imaged by the camera 10 when the real bolt RBn having an axis along the RZ axis is to be fastened, and obtain the coordinates of the head portion RTH by mainly referring to the information on the mark RTMn (n=2, 4) when the real bolt RBn having an axis along an RY axis is to be fastened. Therefore, with the real tool illustrated in FIG. 16, the coordinates of the head portion RTH can be obtained with high quality regardless of a fastening posture of the real bolt RBn.

Figure 17:
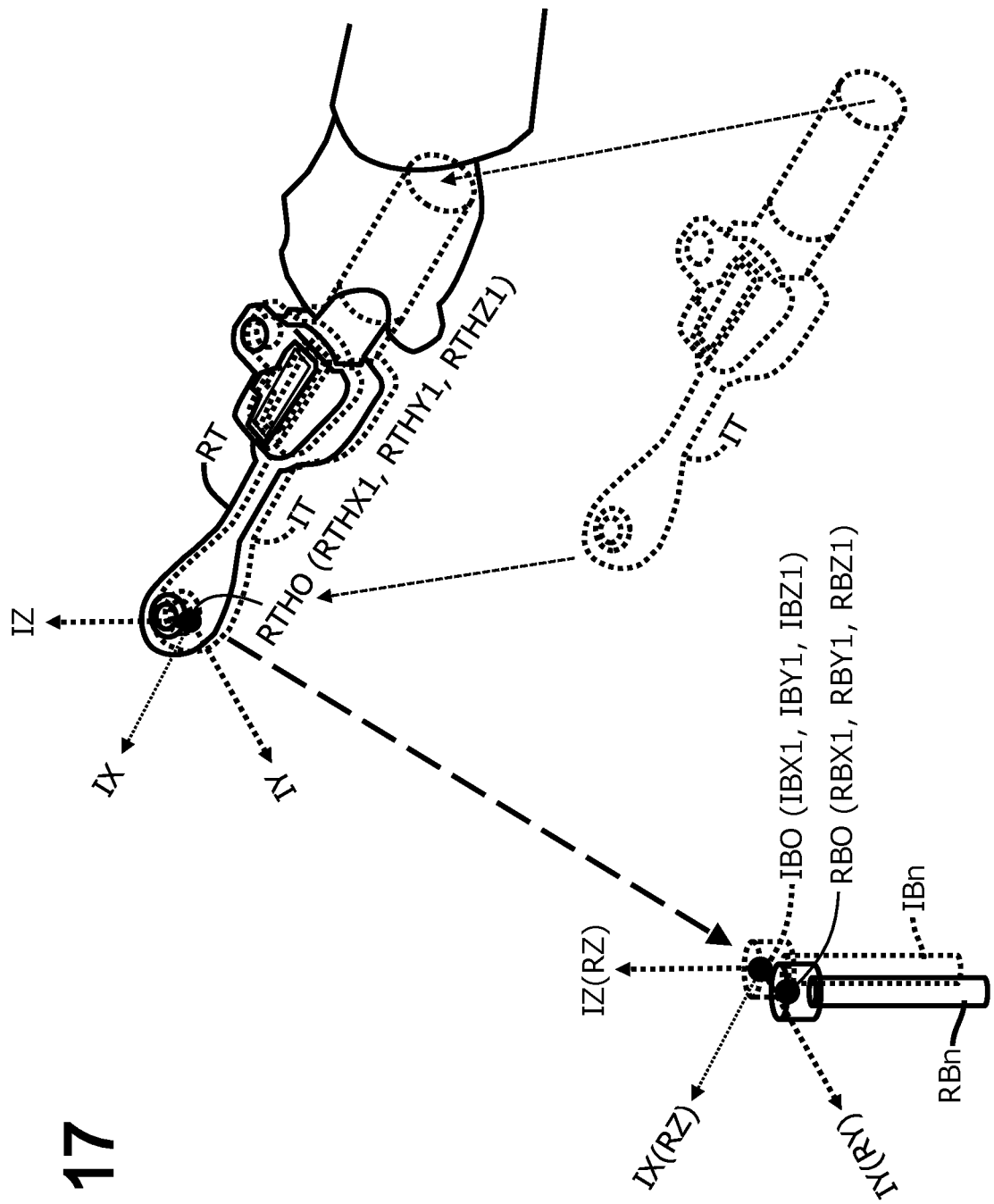
FIG. 17 is a diagram illustrating another example of a procedure (S90) in which a virtual bolt in a one-to-one correspondence with a real bolt is determined as a fastening target object to be fastened by a real tool in an augmented reality space.

FIG. 17 is a diagram illustrating another example of the procedure (S90) in which a virtual bolt in a one-to-one correspondence with a real bolt is determined as a fastening target to be fastened by a real tool in an augmented reality space. Matters common to the process described in FIG. 15 will be omitted, and the description in the following B1 to B8 will be focused on a characteristic process of FIG. 17.

Since B1 to B3 are substantially the same as the description from A1 to A3 described in FIG. 15, a description thereof will be omitted here.

B4: The augmented reality server 12 images, with the camera 10, the real tool RT handled by the operator in the real space, and reads a shape thereof.

B5: The augmented reality server 12 selects, from a plurality of virtual tools IT (such as models created by 3D-CAD) stored in advance in a virtual space (any server), a virtual tool IT in a one-to-one correspondence with the real tool RT imaged with the camera 10 in B4 described above, and calls the virtual tool IT to the augmented reality space.

B6: The augmented reality server 12 superimposes the virtual tool IT called from the virtual space in B5 onto the real tool RT in the augmented reality space, using the coordinates RTHO (RTHX1, RTHY1, RTHZ1) of the head portion RTH of the real tool as a reference point.

B7: The augmented reality server 12 acquires coordinates ITHO (ITHX1, ITHY1, ITHZ1) of a head portion ITH of the virtual tool in the virtual space by superimposing the virtual tool IT onto the real tool RT in B6 described above, and causes the virtual tool IT to follow a movement of the real tool RT in a virtual reality space after acquiring the coordinates of the head portion ITH of the virtual tool.

B8: When the operator puts the real tool RT on the real bolt RBn and determines the real bolt RBn as a fastening target, the augmented reality server 12 compares and verifies the coordinates ITHO (ITHX1, ITHY1, ITHZ1) of the head portion ITH of the virtual tool IT following the real tool RT and the coordinates IBO (IBX1, IBY1, IBZ1) of a virtual bolt Ibn in a one-to-one correspondence with the real bolt RBn, and confirms that the coordinates RTHO of the head portion ITH of the virtual tool IT and the coordinates RBO of the real bolt RBn overlap with each other or are in a range that can be determined as overlapping with each other. By this confirmation, a randomly selected real bolt RBn is determined as the fastening target.

Through the above process, information on the real bolt RBn covered by the head portion RTH of the real tool so as to be selected as the fastening target in the real space, can be transmitted to the virtual bolt IBn of the virtual space, and additional information such as the fastening management information 30 can be stored in any server as information related to the virtual bolt IBn of the virtual space, since the augmented reality server 12 grasps that the real bolt RBn (coordinates RBO) is in a one-to-one correspondence with the virtual bolt IBn (coordinates IBO) in B3.

In B4 and B5 described above, the virtual tool IT in a one-to-one correspondence with the real tool RT is called based on the shape of the real tool RT imaged by the camera 10. A mark incorporating information on the virtual tool IT corresponding to the real tool RT is attached to the real tool RT, and the augmented reality server 12 may call the virtual tool IT from the virtual space to the virtual reality space based on the information of the mark imaged by the camera 10.

By providing the configuration of B7, for example, even when the real bolt RBn cannot be imaged by the camera 10 since the real bolt RBn is hidden by a shielding object, the augmented reality server 12 can obtain the coordinates of the head portion ITH of the virtual tool IT in a one-to-one correspondence with the coordinates of the head portion RTH of the real tool RT, and thus the process can proceed to B8 and B9 following B7.

Figure 18:
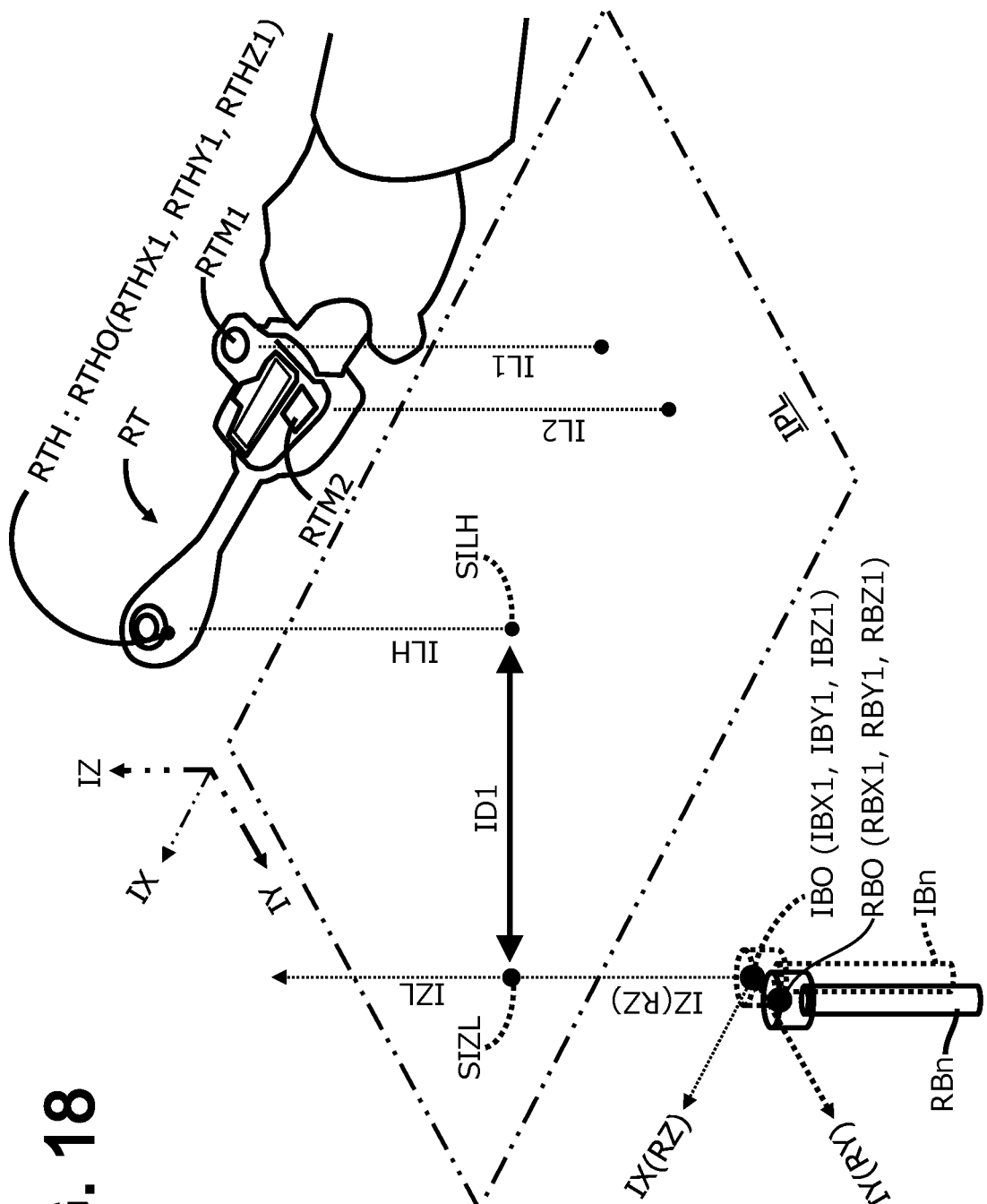
FIG. 18 is a diagram illustrating another example of a procedure (S90) in which a virtual bolt in a one-to-one correspondence with a real bolt is determined as a fastening target object to be fastened by a real tool in an augmented reality space.

FIG. 18 is a diagram illustrating another example of the procedure (S90) in which a virtual bolt in a one-to-one correspondence with a real bolt is determined as a fastening target to be fastened by a real tool in an augmented reality space. Matters common to the processes described in FIGS. 15 and 17 will be omitted, and the description in the following C1 to C8 will be focused on a characteristic process of FIG. 18.

Since C1 to C3 are substantially the same as the description from A1 (B1) to A3 (B3) described in FIG. 15 (FIG. 17), a description thereof will be omitted here.

C4: The augmented reality server 12 images marks (markers) of three points (the head portion RTH of the real tool, the first mark RTM1, and the second mark RTM2) provided in the real tool RT imaged by the camera 10, generates, in the augmented reality space, a virtual line segment ILH having a certain length and extending downward from the head portion RTH of the real tool, and similarly generates a virtual line segment IL1 of the first mark RTM1 and a virtual line segment IL3 of the second mark RTM2.

C5: The augmented reality server 12 generates, in the augmented reality space, a virtual plane IPL including three terminal ends of the virtual line segment ILH, the virtual line segment IL1, and the virtual line segment IL2.

C6: The augmented reality server 12 generates, in the augmented reality space, a virtual perpendicular line IZL that passes through the coordinates IBO (IBX1, IBY1, IBZ1) of the virtual bolt IBn which the operator is promoted to fasten in step 70.

C7: The augmented reality server 12 calculates a distance ID1, in the augmented reality space, on the virtual plane IPL between a contact point SILH with the virtual line segment IL1 on the virtual plane IPL and an intersection point SIZL of the virtual plane IPL and the virtual line IZL.

C8: The augmented reality server 12 determines that a virtual bolt IBn having the virtual perpendicular line IZL, which is a basis of a smallest calculated distance ID1, is determined as the fastening target.

Through the above process, information on the real bolt RBn covered by the head portion RTH of the real tool so as to be selected as the fastening target in the real space, can be transmitted to the virtual bolt IBn of the virtual space, and additional information such as the fastening management information 30 can be stored in any server as information related to the virtual bolt IBn of the virtual space, since the augmented reality server 12 grasps that the real bolt RBn (coordinates RBO) is in a one-to-one correspondence with the virtual bolt IBn (coordinates IBO) in C3.

C4': Instead of the method of generating the virtual plane IPL as described in C4, an IX-IY plane including the coordinates IBO of the virtual bolt IBn is set as a virtual plane IPL', and an intersection point between the virtual plane IPL' and the virtual perpendicular line ILH passing through the head portion RTH of the real tool is set as SILH'. Further, the augmented reality server 12 calculates a distance ID1' on the virtual plane IPL' between the coordinates IBO of the virtual bolt IBn on the virtual plane IPL' and the intersection point SILH', and determines that the virtual bolt IBn having the coordinates IBO, which is a basis of a smallest calculated distance ID1', is determined as the fastening target.

In the case of C4, an analysis load of the augmented reality server 12 may increase since the virtual space IPL also tilts following the real tool RT when the operator tilts the real tool RT. In contrast, in the case of C4', even when the operator tilts the real tool RT, the virtual plane IPL' maintains a posture thereof and does not tilt, and only the perpendicular line ILH' passing through the head portion RTH of the real tool tilts following the tilt. For this reason, the analysis load of the augmented reality server 12 is less likely to increase, the perpendicular line ILH' can be caused to follow the tilt of the real tool RT with a small analysis load, and it can be determined that the virtual bolt IBn is determined as the fastening target.

Figure 19:
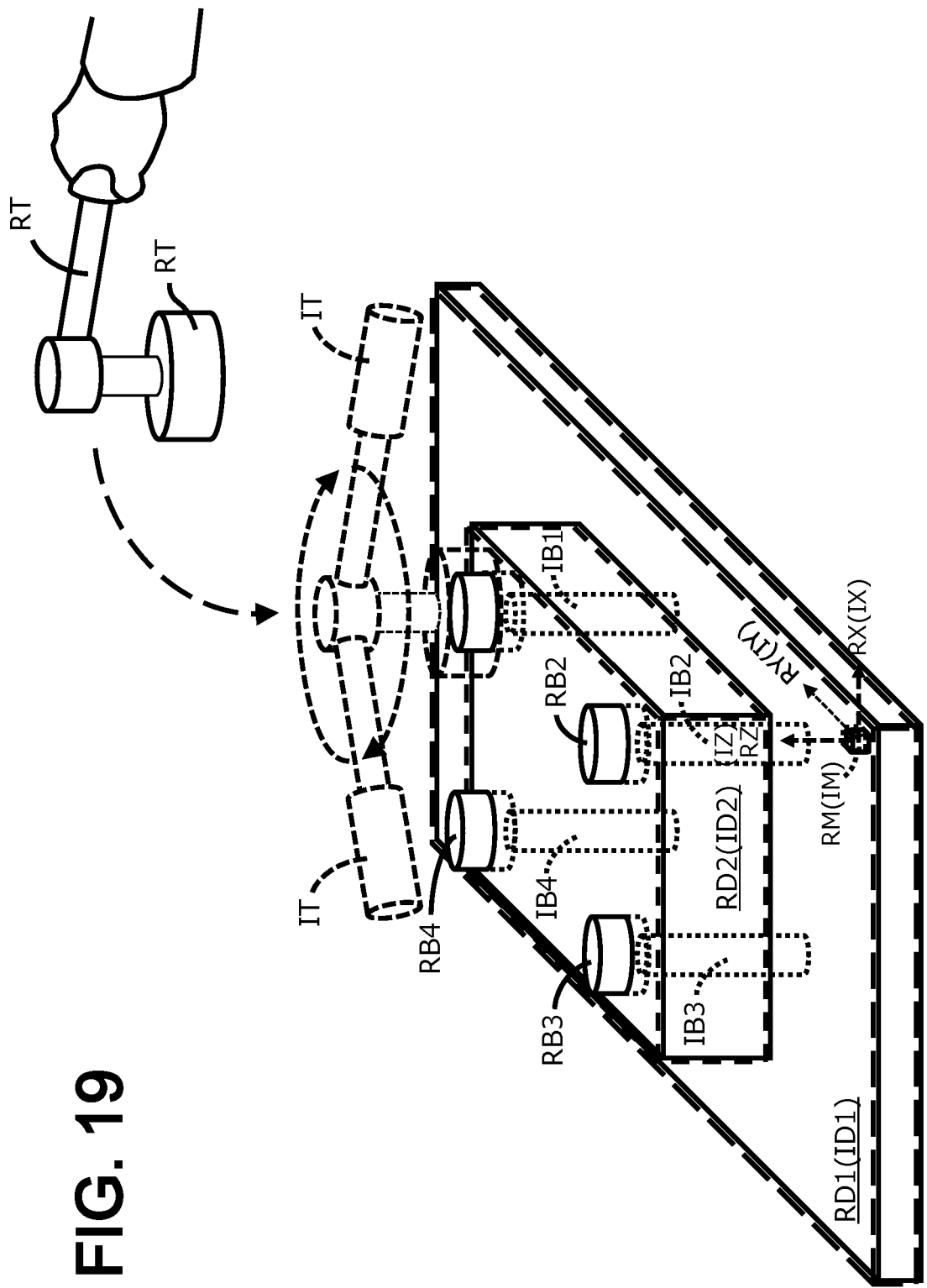
FIG. 19 is a diagram illustrating another example of a procedure (S90) in which a virtual bolt in a one-to-one correspondence with a real bolt is determined as a fastening target object to be fastened by a real tool in an augmented reality space.

FIG. 19 is a diagram illustrating another example of the procedure (S90) in which a virtual bolt in a one-to-one correspondence with a real bolt is determined as a fastening target object to be fastened by a real tool in an augmented reality space. The matters common to the processes described in FIGS. 15, 17, and 18 will be omitted, and the description in the following D1 to D10 will be focused on a characteristic process of FIG. 19.

Since D1 to D3 are substantially the same as the description from A1 (B1, C1) to A3 (B3, C3) described in FIG. 15 (FIGS. 17 and 18), a description thereof will be omitted here.

Since D4 and D5 are substantially the same as the description of B4 and B5 described in FIG. 17, the description thereof will be omitted here.

D6: The augmented reality server 12 acquires the coordinates IBO (IBX1, IBY1, IBZ1) of the virtual bolt IBn that is indicated to the operator as a bolt to be fastened next in step 70 of FIG. 8.

D7: The augmented reality server 12 calls, in the virtual space, the virtual tool IT in a one-to-one correspondence with the real tool RT imaged by the camera 10 which is called in D4, and superimposes the head portion ITH of the virtual tool IT on the coordinates IBO (IBX1, IBY1, IBZ1) of the virtual bolt IBn acquired in D6.

D8: The augmented reality server 12 rotates the virtual tool IT around the IZ axis in the IZ-IY plane, in a state where the vertical axis RZ of the head portion of the virtual tool IT called in D4 is superimposed onto the IZ axis of coordinates IBO (IBX1, IBY1, IBZ1) of the virtual bolt IBn acquired in D6, that is, in a state where both vertical axes overlap with each other.

D9: When the operator superimposes the head portion RTH of the real tool RT on the head portion of the real bolt RBn corresponding to the virtual bolt IBn in accordance with S70, the augmented reality server 12 captures a moment at which the virtual tool IT rotating in D8 is superimposed on the real tool RT.

D10: When the augmented reality server 12 captures the moment at which the rotating virtual tool IT is superimposed on the real tool RT in D9, the augmented reality server 12 determines that the coordinates RTHO (RTHX1, RTHY1, RTHZ1) of the head portion of the real tool RT is superimposed on the coordinates ITHO (ITHX1, ITHY1, ITHZ1) of the head portion of the virtual tool IT.

Further, the augmented reality server 12 compares and verifies the coordinates IBO (IBX1, IBY1, IBZ1) of the virtual bolt Ibn in a one-to-one correspondence with the real bolt RBn covered by the real tool RT and the coordinates RTHO (RTHX1, RTHY1, RTHZ1) of the head portion ITH of the virtual tool IT, and confirms that the coordinates RTHO of the head portion ITH of the virtual tool IT and the coordinates IBO of the virtual bolt IBn overlap with each other or are in a range that can be determined as overlapping with each other. By this confirmation, a randomly selected real bolt RBn is determined as the fastening target.

In the case of D8, since the augmented reality server 12 does not need to cause the virtual tool IT to follow the real tool RT that is moved by the operator in the augmented reality space, the analysis load of the augmented reality server 12 can be prevented from increasing. For this reason, the analysis load of the augmented reality server 12 is less likely to increase and the real tool RT can be superimposed on the virtual tool IR with a small analysis load, and thus it can be determined that the virtual bolt IBn is determined as the fastening target as a result.

As described above, one aspect of the invention is a mechanical fastening unit management method using augmented reality in an augmented reality space generated by superimposing a virtual space on a real space, the real space includes a real fastening unit and a real tool to be covered on the real fastening unit, the virtual space includes a virtual fastening unit and a virtual tool to be covered on the virtual fastening unit, the real fastening unit and the virtual fastening unit are in a one-to-one correspondence in the augmented reality space, an augmented reality configuring system for generating the augmented reality space includes a camera that images the real space and an augmented reality server that is connected to the camera and analyzes an image captured by the camera, and the management method includes a fastening target determining step of selecting the real fastening unit as a fastening target by covering a head portion of the real tool on the real fastening unit, and transmitting information that the real fastening unit is selected as a fastening target to the virtual fastening unit.

Accordingly, in a mechanical fastening operation of automobile maintenance or the like, it is possible to easily record a progress status of the operation without adding an identification mark such as an RFIC tag to the fastening unit, and it is possible to perform a high quality fastening operation that is low in operation cost.

In another aspect of the invention, following steps of the fastening target determining step includes a fastening step of fastening the real fastening unit with the real tool, a fastening management information acquiring step of acquiring fastening management information that the real fastening unit is fastened in the fastening step, and a fastening management information added image storing step of storing a fastening completion image in which the fastening step is completed, and a fastening management information added image obtained by adding the fastening management information to the fastening completion image in the augmented reality space.

As described above, by acquiring and storing the information and the images indicating a state of the completion of the fastening operation, it is possible to record that the fastening operation is surely completed, and it is possible to prevent forgetting to perform the fastening operation.

In another aspect of the invention, the real tool includes a transmission and reception unit that transmits and receives torque information of the real fastening unit, and a display unit that displays the torque information obtained by the transmission and reception unit, and the fastening management information added image storing step is performed by the augmented reality configuring system after it is detected that information that the real fastening unit is fastened at a predetermined torque is displayed on the display unit.

As describe above, by acquiring and displaying the torque information, whether a mechanical fastening unit such as a bolt is fastened at a predetermined torque can be confirmed and the quality of the fastening operation can be improved.

In another aspect of the invention, the management method includes an initial fastening torque storing step of recording that an initial fastening torque, which is observed when the real fastening unit is started to be fastened by the real tool, is generated in the real fastening unit covered by the real tool so as to be selected as a fastening target.

As described above, by recording that an initial torque is generated in the real fastening unit, it is possible to prevent forgetting to perform the fastening operation.

In another aspect of the invention, the real tool includes the head portion, a grip portion to be gripped by an operator, and a handle portion connecting the head portion and the grip portion, the handle portion is provided with a mark, and the mark includes direction information indicating a direction from the mark to the head portion, and information on a distance from the mark to the head portion.

As described above, by providing the direction information indicating the direction from the mark to the head portion and the information on the distance from the mark to the head portion, coordinates indicating a position of the fastening unit can be calculated.

In another aspect of the invention, in the fastening target determining step, the augmented reality server acquires real fastening unit coordinates indicating a position of the real fastening unit and obtained by analyzing the real space imaged by the camera, and real tool head portion coordinates indicating a position of the head portion of the real tool and obtained by analyzing the real space imaged by the camera, detects that the real tool head portion coordinates of the head portion of the real tool overlap with the real fastening unit coordinates of the real fastening unit, and transmits information, that the real fastening unit is covered by the head portion of the real tool so as to be selected as a fastening target, to the virtual fastening unit in a one-to-one correspondence with the real fastening unit.

As describe above, by acquiring the real fastening unit coordinates indicating the position of the real fastening unit and the real tool head portion coordinates indicating the position of the head portion of the real tool, the fastening unit selected as the fastening target can be specified, and the progress status of the fastening operation can be recorded in real time.

In another aspect of the invention, in the fastening target determining step, the augmented reality server acquires real fastening unit coordinates indicating a position of the real fastening unit by analyzing the real space imaged by the camera, calls the virtual tool corresponding to the real tool imaged by the camera from the virtual space to the augmented reality space, acquires virtual tool head portion coordinates indicating a position of a head portion of the virtual tool while the virtual tool overlaps with the real tool, determines that the virtual tool head portion coordinates of the head portion of the virtual tool overlap with the real fastening unit coordinates of the real fastening unit when the virtual tool follows a movement of the real tool and the head portion of the real tool is covered on the real fastening unit, and transmits information, that the real fastening unit is covered by the head portion of the real tool so as to be selected as a fastening target, to the virtual fastening unit in a one-to-one correspondence with the real fastening unit.

In another aspect of the invention, in the fastening target determining step, the augmented reality server acquires real tool head portion coordinates indicating a position of the head portion of the real tool by analyzing the real space imaged by the camera, generates a virtual horizontal plane including the virtual fastening unit which an operator is promoted to fasten, generates a virtual perpendicular line passing through the real tool head portion coordinates of the head portion of the real tool and intersecting the virtual horizontal plane, detects a distance, in the virtual horizontal plane, between an intersection point where the virtual perpendicular line intersects the virtual horizontal plane and virtual fastening unit coordinates indicating a position of the virtual fastening unit, determines, based on the distance, that the real tool head portion coordinates of the head portion of the real tool overlap with the virtual fastening unit coordinates of the virtual fastening unit, and transmits information that the virtual fastening unit in a one-to-one correspondence with the real fastening unit covered by the head portion of the real tool is selected as a fastening target.

In another aspect of the invention, in the fastening target determining step, the augmented reality server, in the augmented reality space, calls the virtual tool corresponding to the real tool imaged by the camera from the virtual space, superimposes a vertical axis of a head portion of the virtual tool onto a vertical axis of virtual fastening unit coordinates, which indicate a position of the virtual fastening unit which an operator is promoted to fasten, rotates the virtual tool around both vertical axes in a horizontal plane, and transmits information that the real fastening unit is superimposed with the head portion of the real tool so as to be selected as a fastening target, to the virtual fastening unit, when the head portion of the real tool is covered on the real fastening unit and when a moment at which the rotating virtual tool overlaps with the real tool is captured.

As a result, whether the fastening unit selected as the fastening target is surely fastened can be determined, and the quality of the fastening operation can be improved.

Although the embodiments of the invention have been described above, the invention is not limited to the embodiments described above, and various modifications can be made without departing from the scope of the invention.

REFERENCE SIGN LIST

RBn (n=1 to 4): real bolt (real space)
RBO: coordinates of real bolt
IBn (n=1 to 4): virtual bolt (virtual space)
IBO: coordinates of virtual bolt
RPn (n=1 to 4): through hole of real component (real space)
RQn (n=1 to 4): screw hole of real base (real space)
AF: axial force
AFS: specified axial force of real bolt
RD1: real base (real space)
RD2: real component (real space)
RM: reference point of real space
IM: reference point of virtual space
RT: real tool
RTH: head portion of real tool
RTE: handle portion of real tool
RTG: grip portion of real tool
RTHO: coordinates of head portion of real tool
RTMn (n=1 to 5): mark (marker) added to real tool
IT: virtual tool
ITH: head portion of virtual tool
ITHO: coordinates of head portion of virtual tool IPL: virtual plane
ILn (n=1 to 3): virtual perpendicular line (line segment)
ID1: distance on virtual plane
SIZL: intersection point of virtual perpendicular line and virtual plane
SIL1: contact point of virtual line segment and virtual plane
TL: completion fastening torque
TS: specified fastening torque
TB: initial fastening torque
5: network
7: wearable device (headgear)
10: camera
12: augmented reality (AR) server
14: transmission type screen (HMD)
22: design information server
26: operation management server
28: torque management server
29: analysis server
30: fastening management information
RX, RY, RZ: coordinate system of real space
IX, IY, IZ: coordinate system of virtual space

The invention claimed is:

1. A mechanical fastening unit management method using an augmented reality space generated by superimposing a virtual space on a real space,
the real space including a real fastening unit and a real tool to be covered on the real fastening unit,
the virtual space including a virtual fastening unit and a virtual tool to be covered on the virtual fastening unit,
the real fastening unit and the virtual fastening unit being in a one-to-one correspondence in the augmented reality space, an augmented reality configuring system for generating the augmented reality space including:
   a camera that images the real space, and
   an augmented reality server that is connected to the camera and analyzes an image captured by the camera,
the management method comprising:
a fastening target determining step of selecting the real fastening unit as a fastening target by covering a head portion of the real tool on the real fastening unit, and transmitting information that the real fastening unit is selected as a fastening target to the virtual fastening unit.

2. The mechanical fastening unit management method using augmented reality according to claim 1, further comprising:
   following the fastening target determining step,
   a fastening step of fastening the real fastening unit with the real tool;
   a fastening management information acquiring step of acquiring fastening management information that the real fastening unit is fastened in the fastening step; and
   a fastening management information added image storing step of storing a fastening completion image in which the fastening step is completed, and a fastening management information added image obtained by adding the fastening management information to the fastening completion image in the augmented reality space.

3. The mechanical fastening unit management method using augmented reality according to claim 2, wherein
   the real tool includes a transmission and reception unit that transmits and receives torque information of the real fastening unit, and a display unit that displays the torque information obtained by the transmission and reception unit, and
   the fastening management information added image storing step is performed by the augmented reality configuring system after it is detected that information that the real fastening unit is fastened at a predetermined torque is displayed on the display unit.

4. The mechanical fastening unit management method using augmented reality according to claim 3, further comprising:
   an initial fastening torque storing step of recording that an initial fastening torque, which is observed when the real fastening unit is started to be fastened by the real tool, is generated in the real fastening unit covered by the real tool so as to be selected as a fastening target.

5. The mechanical fastening unit management method using augmented reality according to claim 4, wherein
   the real tool includes the head portion, a grip portion to be gripped by an operator, and a handle portion connecting the head portion and the grip portion,
   the handle portion is provided with a mark,
     the mark includes direction information indicating a direction from the mark to the head portion, and information on a distance from the mark to the head portion.

6. The mechanical fastening unit management method using augmented reality according to claim 5, wherein
   in the fastening target determining step,
   the augmented reality server:
   acquires real fastening unit coordinates indicating a position of the real fastening unit obtained by analyzing the real space imaged by the camera, and real tool head portion coordinates indicating a position of the head portion of the real tool obtained by analyzing the real space imaged by the camera,
   detects that the real tool head portion coordinates of the head portion of the real tool overlap with the real fastening unit coordinates of the real fastening unit, and
   transmits information, that the real fastening unit is covered by the head portion of the real tool so as to be selected as a fastening target, to the virtual fastening unit in a one-to-one correspondence with the real fastening unit.

7. The mechanical fastening unit management method using augmented reality according to claim 5, wherein
   in the fastening target determining step,
   the augmented reality server:
   acquires real fastening unit coordinates indicating a position of the real fastening unit by analyzing the real space imaged by the camera,
   calls the virtual tool corresponding to the real tool imaged by the camera from the virtual space to the augmented reality space,
   acquires virtual tool head portion coordinates indicating a position of a head portion of the virtual tool while the virtual tool overlaps with the real tool,
   determines that the virtual tool head portion coordinates of the head portion of the virtual tool overlap with the real fastening unit coordinates of the real fastening unit when the virtual tool follows a movement of the real tool and the head portion of the real tool is covered on the real fastening unit, and
   transmits information, that the real fastening unit is covered by the head portion of the real tool so as to be selected as a fastening target, to the virtual fastening unit in a one-to-one correspondence with the real fastening unit.

8. The mechanical fastening unit management method using augmented reality according to claim 5, wherein
   in the fastening target determining step,
   the augmented reality server:
   acquires real tool head portion coordinates indicating a position of the head portion of the real tool by analyzing the real space imaged by the camera,
   generates a virtual horizontal plane including the virtual fastening unit which an operator is promoted to fasten,
   generates a virtual perpendicular line passing through the real tool head portion coordinates of the head portion of the real tool and intersecting the virtual horizontal plane,
   detects a distance, in the virtual horizontal plane, between an intersection point where the virtual perpendicular line intersects the virtual horizontal plane and virtual fastening unit coordinates indicating a posit ion of the virtual fastening unit,
   determines, based on the distance, that the real tool head portion coordinates of the head portion of the real tool overlap with the virtual fastening unit coordinates of the virtual fastening unit, and
   transmits information that the virtual fastening unit in a one-to-one correspondence with the real fastening unit covered by the head portion of the real tool is selected as a fastening target.

9. The mechanical fastening unit management method using augmented reality according to claim 5, wherein
   in the fastening target determining step,
   in the augmented reality space, the augmented reality server:
   calls the virtual tool corresponding to the real tool imaged by the camera from the virtual space, superimposes a vertical axis of a head portion of the virtual tool onto a vertical axis of virtual fastening unit coordinates, which indicate a position of the virtual fastening unit which an operator is promoted to fasten, and rotates the virtual tool around both vertical axes in a horizontal plane, and transmits information that the real fastening unit is superimposed with the head portion of the real tool so as to be selected as a fastening target, to the virtual fastening unit, when the head portion of the real tool is covered on the real fastening unit and when a moment at which the rotating virtual tool overlaps with the real tool is captured.

* * * * *